United States Patent
Yamamoto et al.

(10) Patent No.: US 7,659,035 B2
(45) Date of Patent: Feb. 9, 2010

(54) NONAQUEOUS ELECTROLYTE SECONDARY BATTERY

(75) Inventors: Takeru Yamamoto, Fukushima (JP); Takehiko Tanaka, Fukushima (JP); Tomitaro Hara, Fukushima (JP); Hirouki Akashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 11/694,187

(22) Filed: Mar. 30, 2007

(65) Prior Publication Data

US 2007/0298322 A1    Dec. 27, 2007

(30) Foreign Application Priority Data

Mar. 31, 2006  (JP)  ............... 2006-101159
Mar. 2, 2007   (JP)  ............... 2007-053138

(51) Int. Cl.
    *H01M 4/62*  (2006.01)
(52) U.S. Cl. .............. 429/232; 429/218.1; 429/316; 429/317; 429/231.8
(58) Field of Classification Search ............ 429/218.1, 429/232, 306, 307, 316, 317, 231.8
See application file for complete search history.

(56) References Cited

U.S. PATENT DOCUMENTS

| 5,705,292 A | 1/1998 | Yukita et al. |
| 2003/0019713 A1 | 1/2003 | Gudlin |
| 2007/0264571 A1 * | 11/2007 | Ryu et al. ............. 429/218.1 |

FOREIGN PATENT DOCUMENTS

| JP | 09-092336 | 4/1997 |
| JP | 9-219199 | 8/1997 |
| JP | 3371301 | 11/2002 |
| JP | 3552361 | 5/2004 |
| JP | 3588885 | 8/2004 |
| JP | 2004-296108 | * 10/2004 |
| JP | 2006-253087 | 9/2006 |
| WO | WO 2003-019713 | 3/2003 |

* cited by examiner

*Primary Examiner*—Laura S Weiner
(74) *Attorney, Agent, or Firm*—K&L Gates LLP

(57) ABSTRACT

A nonaqueous electrolyte secondary battery is provided. The nonaqueous electrolyte secondary battery includes a cathode; an anode containing at least an anode active material and a conductive agent; and a nonaqueous electrolyte, wherein the anode has an anode mixture, the anode mixture containing 1.5 wt % or more to 10 wt % or less aluminum oxide which has an average particle diameter of 0.1 μm or more to 5.0 μm or less.

6 Claims, 8 Drawing Sheets

NONAQUEOUS ELECTROLYTE SECONDARY BATTERY

CROSS REFERENCES TO RELATED APPLICATIONS

The present application claims priority to Japanese Patent Application Nos. JP 2006-101159 filed on Mar. 31, 2006, and JP 2007-053138 filed on Mar. 2, 2007, the entire contents of which are being incorporated herein by reference.

BACKGROUND

The present application relates to nonaqueous electrolyte secondary batteries, and in particular, to a lithium ion secondary battery using a lithium complex oxide as an electrode material.

In recent years, with the remarkable progress of mobile electronics technology, mobile electronics devices such as cellular phones and notebook PCs are increasingly recognized as fundamental technologies supporting the advanced information-oriented society. Further, research and development aimed at sophistication of these devices are being vigorously made, simultaneously electric power consumption of electron devices is growing steadily. On the other hand, these electronics devices should work for long hours, consequently secondary batteries for driving these devices are desired to have higher energy density.

The energy density of a battery is preferably higher from the viewpoints of occupying volume and weight of the battery in electronics devices. For satisfying the demand, at present, nonaqueous electrolyte secondary batteries, in particular, lithium ion secondary batteries utilizing doping/dedoping of lithium ions are included in most devices due to their excellent energy density.

In common cases, a lithium ion secondary battery has, for example, a cathode including a cathode collector having formed thereon a cathode active material layer using a lithium complex oxide such as lithium cobaltate, and, for example, an anode including an anode collector having formed thereon an anode active material layer using a carbon material, and is used at an operating voltage of 2.5 V to 4.20 V. The terminal voltage of a single cell can be increased up to 4.20 V largely owing to the excellent electrochemical stability of the nonaqueous electrolyte material, separator, and others.

However, in a lithium ion secondary battery as described above which operates at a maximum voltage of 4.20 V, the entire theoretical capacity of the cathode active material contained therein such as lithium cobaltate is not thoroughly utilized for discharging and charging, and only about 60% of the capacity is utilized. Therefore, for further improving the battery characteristic of a secondary battery, a lithium ion secondary battery described in International Publication No. WO 03/019713 has an increased charge cutoff voltage of 4.25 V or higher.

It is known that the above-described battery has a charged voltage of 4.25 V or higher, which increases the amount of doped/dedoped lithium between the layers of a carbon material to impart a larger capacity and higher energy density to the lithium ion secondary battery.

On the other hand, a higher energy density tends to raise the peak temperature inside the battery in case of abnormal heat generation. When a short circuit current is passed through a battery because of misuse or destructive test, Joule heat is generated. The amount of such heat is further growing in the development for increasing the energy density of the past.

Heretofore, large-capacity lithium ion secondary batteries have been improved in their characteristics and reliability by adding aluminum or the like to the battery system.

For example, a battery described in Japanese Patent No. 3552361 prevents the influences of internal short-circuit in a large-capacity lithium ion secondary battery from extending to between adjacent cathode and anode, and prevents direct short-circuit of the cathode and anode.

In Japanese Patent No. 3552361, an interface where the cathode is not opposed to the anode is provided, and a heat resistant layer is provided on the interface by spraying powder of a metal oxide such as aluminum oxide ($Al_2O_3$) by, for example, plasma spraying. The heat resistant layer prevents the influences of internal short-circuit from extending to between the adjacent cathode and anode. In addition, even when fusion or decomposition of the separator is caused by heat, the layer secures electrical insulation between the cathode and anode, and prevents direct short-circuit of the cathode and anode.

However, the layer of an anode active material during charging may cause exothermic reaction when subjected to heat generated by abnormal use or misuse, or other electric heat generated in the battery system. Therefore, the heat resistant layer provided on the interface between the cathode and anode contributes to stabilize the inside of the battery, but does not decrease the temperature in the battery in case of abnormal heat generation.

Besides, the addition of aluminum oxide or other substances devoid of active material capacity to a battery system causes the decrease in the volume efficiency, and the increase in resistance and thus deteriorates the load characteristic, which makes it difficult to strike a balance between battery characteristic and reliability.

SUMMARY

Accordingly, it is desired to provide a nonaqueous electrolyte secondary battery which is capable of inhibiting the temperature rise in the battery in case of abnormal heat generation of the battery to prevent the deterioration of battery characteristics such as rated energy density and load characteristic.

According to an embodiment, there is provided a nonaqueous electrolyte secondary battery including a cathode, an anode containing at least an anode active material and a conductive agent, and a nonaqueous electrolyte, the anode having an anode mixture, the anode mixture containing 1.5 wt % or more to 10 wt % or less of aluminum oxide which has an average particle diameter of 0.1 μm or more to 5.0 μm or less.

According to an embodiment, there is provided an anode containing at least an anode active material and a conductive agent, wherein the anode has an anode mixture, the anode mixture containing 1.5 wt % or more to 10 wt % or less aluminum oxide which has an average particle diameter of 0.1 μm or more to 5.0 μm or less.

According to an embodiment, an appropriate amount of the above-described aluminum oxide is added to an anode mixture, thereby aluminum oxide serving as a heat spreader resides in the void portions in the active material layer to improve the volume efficiency of the anode. In addition, the aluminum oxide is three-dimensionally intertwined with the conductive agent to improve the dispersibility.

According to an embodiment, deterioration of the electrical conductivity is inhibited with no decrease in the battery capacity, and favorable heat dissipation is achieved, hence the decrease in the load characteristic is prevented.

Additional features and advantages are described herein, and will be apparent from, the following Detailed Description and the figures.

DETAILED DESCRIPTION

Embodiments are described with reference to accompanying drawings.

(1) First Embodiment

Figure 1:
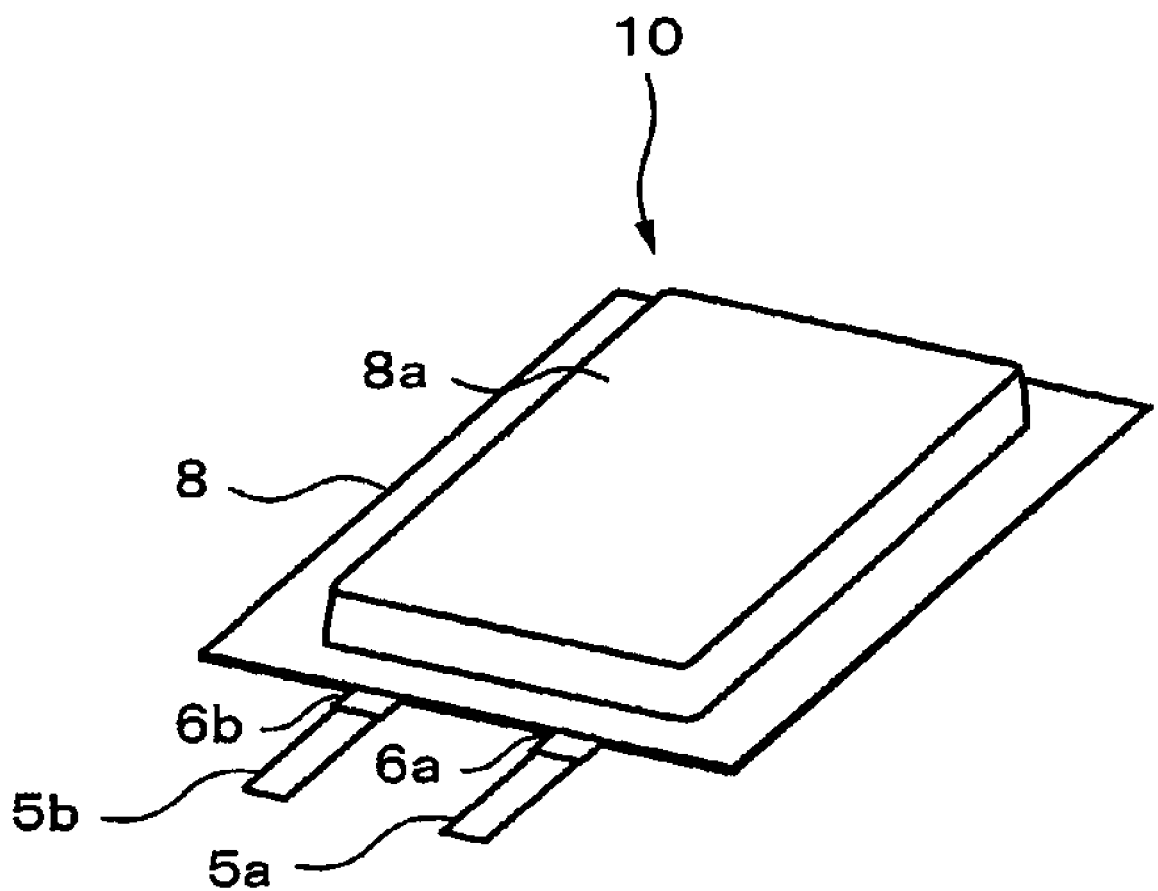
FIG. 1 is a schematic view showing the appearance of a nonaqueous electrolyte secondary battery according to a first embodiment.
Figure 2:
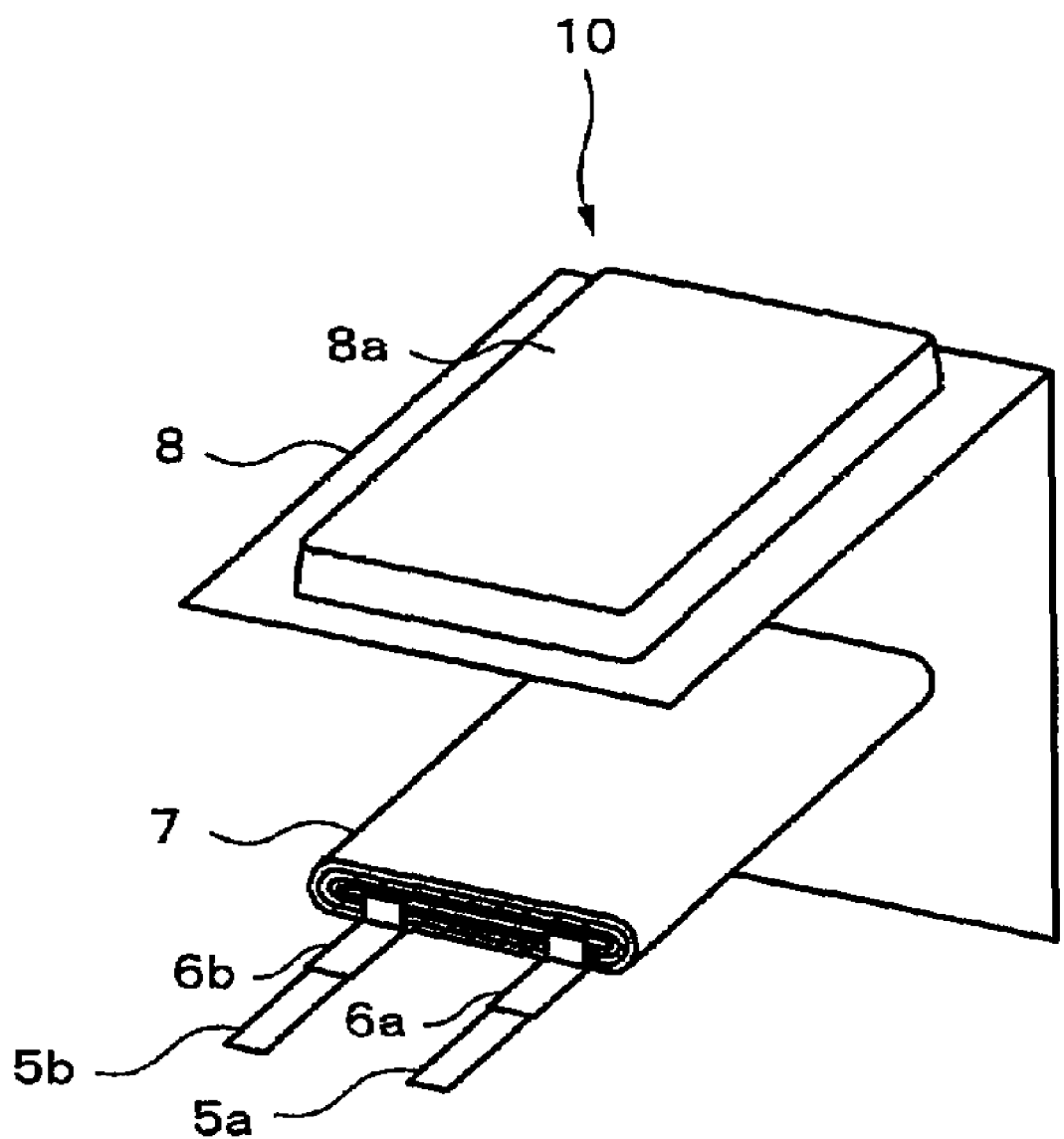
FIG. 2 is a schematic view showing the structure of a nonaqueous electrolyte secondary battery according to the first embodiment.

FIG. 1 is a schematic view showing an appearance of a nonaqueous electrolyte secondary battery according to a first embodiment. As shown in FIG. 2, the nonaqueous electrolyte secondary battery 10 is made by armoring a battery element 7 such that the battery element 7 is accommodated in a battery element accommodating section 8a which is a recess formed on a laminate film 8 as the covering material, and sealing the periphery of the battery element 7. The structure of the battery element 7 is described below.

[Battery Element]

Figure 3:
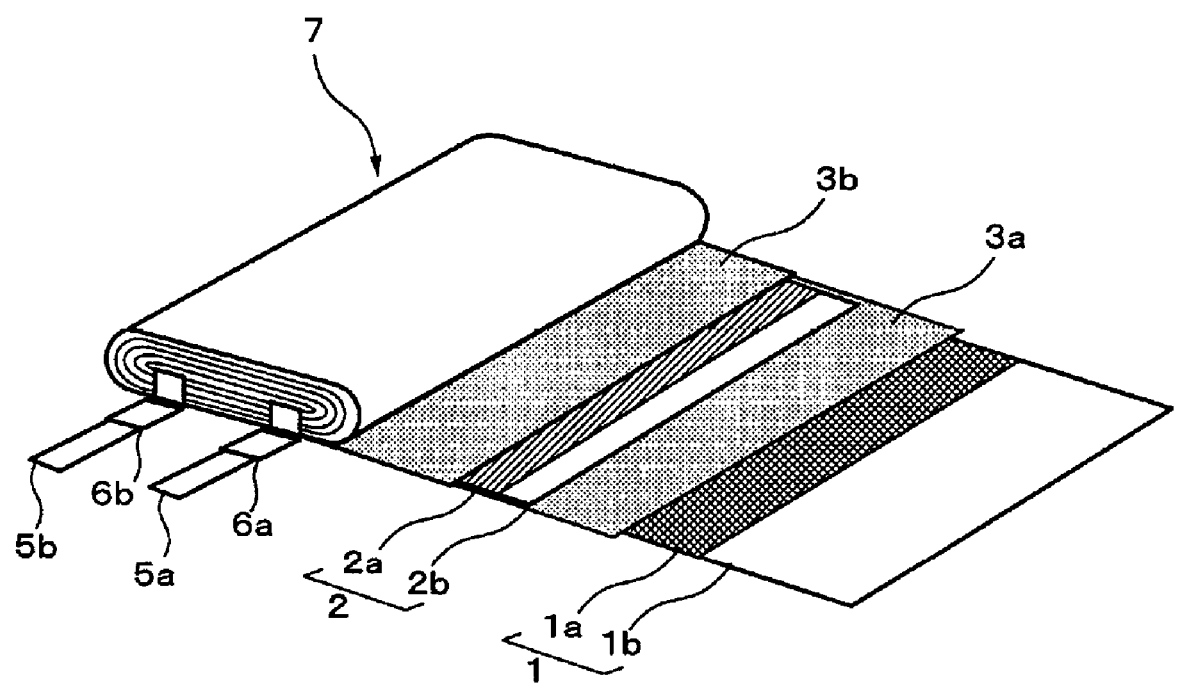
FIG. 3 is a schematic view showing the appearance of a battery element according to the first embodiment.

FIG. 3 shows an appearance of the battery element 7. In the battery element 7, a strip cathode 1, a separator 3a, a strip anode 2 disposed in opposition to the cathode 1, and a separator 3b (hereinafter, referred to as separator 3 as appropriate when no specific separator is designated) are laminated in this order, and wound in a longitudinal direction. A cathode terminal 5a connected to the cathode 1 and an anode terminal 5b connected to the anode 2 are derived from the battery element 7, and sealants 6a and 6b made of a piece of resin such as polyethylene PE are each disposed on the cathode terminal 5a and the anode terminal 5b for improving the adhesiveness of the terminals to the laminate film 8 as covering material.

[Covering Material]

Figure 4:
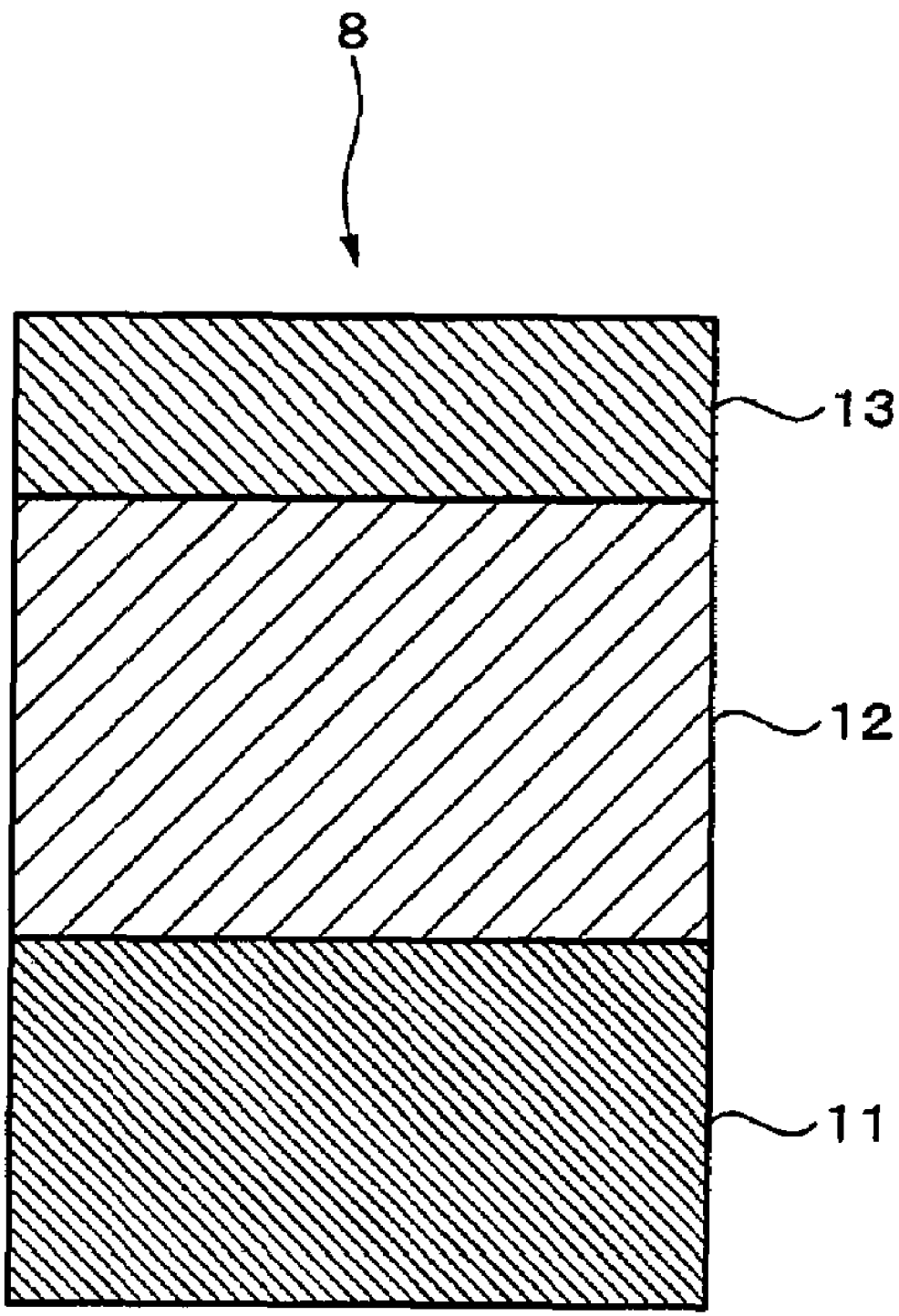
FIG. 4 is a cross-sectional view showing a covering material according to the first embodiment.

As the covering material, for example, a laminate film 8 having a laminate structure as shown in FIG. 4 is used, in which a fusion layer 11, a metal layer 12, and a surface protective layer 13 are laminated in this order. The fusion layer 11 is made of a polymer film, and examples of the material of the polymer film include polypropylene PP and polyethylene PE. The metal layer 12 is made of a metal foil, and examples of the material of the metal foil include aluminum. The material of the metal foil may be a metal other than aluminum. Examples of the material of the surface protective layer 13 include nylon Ny and polyethylene terephthalate PET. The surface on the fusion layer 11 side is used as the accommodating surface for accommodating the battery element 7. The battery element accommodating section 8a is provided by deep drawing or other treatment from the fusion layer side.

[Cathode]

The cathode 1 is made by forming a cathode active material layer 1a containing a cathode active material on the surface of a cathode collector 1b. The cathode collector 1b may be, for example, a metal foil such as an aluminum Al foil, nickel Ni foil, or stainless steel SUS foil.

The cathode active material layer 1a includes, for example, one or two or more cathode active materials capable of adsorbing or releasing lithium, and as necessary further includes a conductive agent and a binding agent.

The cathode material capable of adsorbing or releasing lithium is preferably, for example, a lithium-containing transition metal compound such as lithium oxide, lithium phosphate, and lithium sulfide. For increasing the energy density, the material is preferably a lithium-containing transition metal oxide which contains lithium, a transition metal element, and oxygen O, and more preferably the transition metal element is at least one selected from the group consisting of cobalt Co, nickel, manganese Mn, and iron Fe. Examples of the lithium-containing transition metal compound include a lithium-containing transition metal oxide having a layered rock-salt structure represented by the formula 1 below, and a lithium complex phosphate having an olivine structure represented by the formula, and specific examples thereof include $LiNi_{0.50}Co_{0.20}Mn_{0.30}O_2$, $LiCoO_2$, $LiNiO_2$, $LiNi_cCo_{1-c}O_2 (0<c<1)$, and $LiMn_2O_4$, $LiFePO_4$.

$Li_pNi_{(1-q-r)}Mn_qM1_rO_{(2-y)}X_z$ [Formula 1]

wherein M1 represents at least one selected from Groups 2 to 15 elements excluding Ni and Mn, X represents at least one selected from Groups 16 and 17 elements excluding oxygen (O), $0 \leq p \leq 1.5$, $0 \leq q \leq 1.0$, $0 \leq r \leq 1.0$, $-0.10 \leq y \leq 0.20$, and $0 \leq z \leq 0.2$.

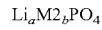
$Li_aM2_bPO_4$ [Formula 2]

wherein M2 represents at least one selected from Groups 2 to 15 elements, $0 \leq a \leq 2.0$, and $0.5 \leq b \leq 2.0$.

Examples of the conductive agent include a carbon material such as carbon black or graphite. Examples of the binding agent include polyvinylidene fluoride PVdF, polytetrafluoroethylene, and polyacrylonitrile.

[Anode]

The anode 2 is made by forming an anode active material layer 2a containing an anode active material on both the surfaces of an anode collector 2b. The anode collector 2b includes, for example, a metal foil such as a copper Cu foil, nickel foil, or stainless steel foil.

The anode active material layer 2a contains, for example, one or two or more anode active materials capable of adsorbing or releasing lithium, and aluminum oxide fine powder, and further contains a conductive agent and a binding agent.

The nonaqueous electrolyte secondary battery used in the first embodiment is preferably designed to be charged to a high voltage, for example 4.25 V or higher to 6.00 V or lower, or 4.30 V or higher to 4.55 V or lower. The increase in the charged voltage from the voltage in the past of 4.20 V allows the utilization of the capacity of the cathode active material which has not been utilized. More specifically, more lithium is released from a unit mass of the cathode active material and adsorbed to the anode active material, which allows the increase in the capacity and energy density.

As the anode active material capable of adsorbing and releasing lithium, a carbon material or a composite material of a metal-based material and a carbon material, which are capable of doping/dedoping a lithium metal, lithium alloy, or lithium, is used. Specific examples of the carbon material capable of doping/dedoping lithium include graphite, non-easy-graphitizable carbon, and easy-graphitizable carbon. More specific examples thereof include carbon materials such as pyrolytic carbon, cokes (pitch cokes, needle cokes, petroleum cokes), graphite, glassy carbon, sintered bodies of organic polymer compounds (materials obtained by sintering polymer materials such as phenol resin and furan resin at a proper temperature for carbonization), carbon fiber, and active carbon.

Above carbon materials are preferable because their crystal structure scarcely changes during discharging and charging, which makes it possible to achieve a high discharge/charge capacity and a favorable cycling characteristic. Graphite is particularly preferable because it has a large capacity for achieving a higher energy density. Non-easy-graphitizable carbon is also preferable because it offers excellent characteristics. For readily achieving a higher energy density of the battery, the material preferably has a low discharging/charging potential, or more specifically a discharging/charging potential close to that of a lithium metal.

Lithium may be alloyed with various types of metals, and examples thereof include metals, semimetals, alloys, and compounds capable of forming an alloy with a lithium metal or lithium. Specific examples of the metals or semimetals capable of constituting the anode material include tin Sn, lead Pb, magnesium, aluminum Al, boron B, gallium Ga, silicon Si, indium In, zirconium Zr, germanium Ge, bismuth Bi, cadmium Cd, antimony Sb, silver Ag, zinc Zn, arsenic As, hafnium Hf, yttrium Y, and palladium Pd.

In particular, the anode material is preferably a simple substance of a metal element or semimetal element of Group 4B in the short form periodic table, or an alloy or compound including the element as a constituent element, and most preferably includes at least one of silicon and tin as the constituent element. Silicon and tin are highly capable of adsorbing and releasing lithium, and allow to achieve a higher energy density.

The tin alloy contains, for example, as the second constituent element other than tin, at least one selected from the group consisting of silicon, nickel, copper, iron, cobalt, manganese, zinc, indium, silver, titanium Ti, germanium, bismuth, antimony Sb, and chromium. Examples of silicon alloys include those including as the second constituent element at least one selected from the group consisting of tin, nickel, copper, iron, cobalt, manganese, zinc, indium, silver, titanium, germanium, bismuth, antimony and chromium.

The tin compound or silicon compound includes, for example, oxygen (O) or carbon (C), and may further include the above-described second constituent elements in addition to tin or silicon. Examples of the second constituent elements include carbon alloys with tin, cobalt, indium, aluminum, or silicon. They are preferably used in combination with the above-described carbon materials for achieving a higher energy density and stable cycling characteristic.

Examples of the anode material capable of adsorbing and releasing lithium further include other metal compounds or polymer materials. Examples of other metal compounds include sulfides such as NiS and MoS, and lithium nitrides such as $LiN_3$, and examples of polymer materials include polyacetylene.

The conductive agent may be a material having an electric conductivity of $5.0 \times 10^5$ S/m or more, and examples thereof include vapor grown carbon fiber (VGCF) having an electric conductivity of $1.0 \times 10^6$ S/m and nickel having an electric conductivity of $1.38 \times 10^7$ S/m. Examples of the binding agent include polyvinylidene fluoride (PVdF) and styrene butadiene rubber. Examples of the solvent include N-methylpyrrolidone and methyl ethyl ketone.

Aluminum oxide serves as a heat spreader. The average particle diameter of aluminum oxide to be used is 0.1 μm or more to 5.0 μm or less, preferably 0.1 μm or more to 3.0 μm or less. As described above, aluminum oxide has no active material capacity. Therefore, the battery capacity decreases as the amount of aluminum oxide increases. However, aluminum oxide having a particle diameter in an appropriate range is dispersed into the voids in the electrode active material layer.

If the average particle diameter is less than 0.1 μm, aluminum oxide fine powder has a large surface area and has many contact points within the electrode, which results in the insufficient increase in the volume density even with pressing after applying the anode mixture to the anode collector. If the particle diameter is too small, fine powder may aggregate to form secondary and tertiary particles which may not reside in the voids. On the other hand, when the average particle diameter is more than 5.0 μm, aluminum oxide may not reside in voids in the active material layer, which results in failure to increase the volume density even with sufficient pressing, and aluminum oxide insufficiently dispersed within the electrode hardly achieve sufficient heat dissipation effect within the battery system.

Therefore, aluminum oxide to be used has an average particle diameter of 0.1 μm or more to 5.0 μm or more, preferably 0.1 μm or more to 3.0 μm or less. The aluminum oxide increases the nonactive material ratio in the anode 2, but is dispersed into the void layer within the anode electrode to increase the volume density. The thickness of the anode containing aluminum oxide is equal to that of a anode of the past. The average particle diameter of aluminum oxide is measured, for example, with a laser diffraction type particle size analyzer (SALD-2100, manufactured by Shimadzu Corporation.), or a scanning electron microscope (SEM).

In the anode mixture containing an anode active material, aluminum oxide, binding agent, and conductive agent, the content of the above-described aluminum oxide is 1.5% or more to 10% or less by weight, preferably 3% or more to 5% or less by weight. If the content of aluminum oxide is less than 1.5% by weight, the heat dissipation effect is too small to inhibit the temperature rise in the battery, and if the content is more than 10% by weight, the amount of aluminum oxide which does not contribute to the active material capacity is so large that the battery capacity is decreased.

Further, aluminum oxide is added such that the volume ratio of aluminum oxide to the conductive agent decreases within the range of preferably 0.8 or more to 5.0 or less, and more preferably 0.8 or more to 2.0 or less. Aluminum oxide has high insulation properties. Therefore, if aluminum oxide is added to the anode mixture as it is, it normally inhibits the conductive path within the electrode to deteriorate the load characteristic. However, when the content of aluminum oxide, the electric conductivity of the conductive agent, and the volume ratio between aluminum oxide and the conductive agent are appropriate, aluminum oxide three-dimensionally intertwines with the conductive agent in an unprecedented manner, hence has higher dispersibility than when blended alone, inhibits deterioration of both electrical conductivity and heat dissipation, and prevents deterioration of load characteristic.

The volume ratio of aluminum oxide to the conductive agent is calculated as follows:

(Percentage by weight of aluminum oxide/true density of aluminum oxide)/(percentage by weight of conductive agent/true density of conductive agent)

wherein the true density of aluminum oxide is 3.95 g/cm$^3$, the conductive agent is graphite such as VGCF and nickel, the true density of graphite is 2.26 g/cm$^3$, and the true density of nickel is 8.89 g/cm$^3$.

Regarding the voids in which aluminum oxide resides, the void ratio in the anode active material is defined as described below. The voids are determined by subtracting the volume filled with the active material, conductive agent, and binding agent from the volume of the anode active material, and represented by: void ratio [%]=100−filling rate.

Volume of material=(weight of anode active material/true density of anode active material)+(weight of conductive agent/true density of conductive agent)+(weight of binding agent/true density of binding agent)

Volume of mixture=electrode area×thickness of electrode mixture

Filling rate=(volume of active material/volume of mixture)×100

Void ratio=100−filling rate wherein, the true density of graphite used as the anode active material is 2.26 g/cm$^3$, and the true density of PVdF used as the binding agent is 1.82 g/cm$^3$.

For example, when 10 g of an anode mixture containing 93% by weight of graphite as the anode active material, 3% by weight of VGCF as the conductive agent, and 4% by weight of PVdF as the binding agent are applied with a width of 4 cm, an electrode length of 15 cm, and a mixture thickness of 100 μm, the volume of the material is calculated as follows:

(9.3 [g]/2.26 [g/cm$^3$])+(0.3 [g]/2.26 [g/cm$^3$])+(0.4 [g]/1.82 [c/cm$^3$])=4.467 [cm$^3$]

The volume of the mixture volume is calculated as follows:

4×15×0.1=6 [cm$^3$]

Accordingly, the filling rate and void ratio are calculated as follows:

Filling rate=(4.467/6)×100=74.4[%]

Void ratio=100−74.4=25.6[%]

In this secondary battery, an electrochemical equivalent of an anode material which can dope and dedope lithium is larger than that of the cathode and a lithium metal is not precipitated into the anode during the charging.

In this secondary battery, an open circuit voltage (that is, battery voltage) upon full charging is set so as to lie within a range from 4.25V to 6.00V, both inclusive, more preferably within a range from 4.25V to 4.55V, both inclusive. Therefore, even in the case of the same cathode active material, since an emission amount of lithium per unit mass is larger than that of the battery in which the open circuit voltage upon full charging is equal to 4.20V, an amount of the cathode active material and that of the anode active material are adjusted in accordance with the emission amounts of lithium. Thus, the high energy density can be obtained.

[Electrolyte]

As a nonaqueous solvent, specifically, a mixed solvent containing at least propylene carbonate and ethylene carbonate may be used. The mixed solvent may be further mixed with one or a plurality kinds of solvents such as γ-butyrolactone, dimethyl carbonate, diethyl carbonate, ethyl methyl carbonate, dipropyl carbonate, ethylpropyl carbonate, and derivatives of these carbonates in which hydrogen of the ester carbonate is substituted with halogen.

As an electrolyte salt, the above-described materials used for the electrolyte may be used. Specific examples thereof include lithium salts such as $LiClO_4$, $LiBF_4$, $LiPF_6$, $LiN(CF_3SO_2)_2$, $LiN(C_2F_5SO_2)_2$, $LiAsF_6$, $LiCF_3SO_3$, and $LiC(SO_2CF_3)_3$. Among them, $LiPF_6$ and $LiBF_4$ are preferable from the viewpoint of oxidation stability. These lithium salts may be used alone or in combination of a plurality of them.

A gelatinous electrolyte is formed by gelating the above-described electrolytic solution with a matrix polymer. The matrix polymer suffices as long as it is miscible with to gelate a nonaqueous electrolytic solution prepared by dissolving the above-described electrolyte salt in the above-described non-aqueous solvent. Examples of the matrix polymer include polyvinylidene fluoride, polyvinyl fluoride, polypropylene oxide, and polyacrylonitrile. These polymers may be used alone or in combination of a plurality of them.

Among them, most preferable are copolymers of hexafluoro propylene and polyvinylidene fluoride or vinylidene fluoride. These polymers have a weight average molecular weight in the range of $2.0\times10^5$ to $1.0\times10^6$ (200,000 to 1,000,000).

[Separator]

The separator 3 includes a porous film of, for example, a polyolefin-based material such as polyethylene PE or polypropylene PP, and may have a laminated structure having two or more porous films.

The thickness of the separator 3 is preferably 3 to 20 μm. If the thickness of the separator 3 is less than 3 μm, the mechanical strength of the film decreases, which results in short-circuit in the battery. On the other hand, if the thickness is more than 20 μm, the capacity significantly decreases as the increase in the number of cycles of the battery. In addition, the amount of filled active material decreases to lower the battery capacity, simultaneously decreases the ion conductivity to deteriorate the current characteristic.

When the separator 3 has a laminated structure having two or more porous films, for example, the separator includes a base material layer and a surface layer provided on the surface of the base material layer. The structure is two-layer structure in which a surface layer is provided on a surface of a base material layer on the side opposed to the cathode, or three-layer structure in which a surface layer is provided on both the surfaces of a base material layer. The base material layer includes, for example, a porous film of polyethylene PE, and the surface layer includes, for example, a porous film of polypropylene PP.

The above nonaqueous electrolyte secondary battery according to the first embodiment is made, for example, as described below.

[Cathode Making Step]

The above-described cathode active material, binding agent, and conductive agent are uniformly mixed to make a cathode mixture, and the cathode mixture is dispersed into a solvent to make a cathode mixture slurry. Subsequently, the cathode mixture slurry is uniformly applied to a cathode collector by a doctor blade method or other method, dried at a high temperature to remove the solvent, thus a cathode active material layer 1a is formed. As the solvent, for example, N-methylpyrrolidone is used.

The cathode 1 has a cathode terminal 5a which is connected to one end of a cathode collector 1b by spot welding or ultrasonic welding. The cathode terminal 5a is desirably a metal foil, but may not be metal as long as it is electrochemically and chemically stable and electrically conductive. Examples of the material of the cathode terminal 5a include aluminum.

[Anode Making Step]

An anode active material, aluminum oxide, a binding agent, and a conductive agent are uniformly mixed to make an anode mixture, and the anode mixture is dispersed into a solvent to make an anode mixture slurry. As described above, the content of aluminum oxide shall be in the range of 1.5% or more to 10% or less by weight, preferably 3% or more to 5% or less by weight with reference to the anode mixture. The volume ratio of aluminum oxide to the conductive agent is preferably in the range of 0.8 or more to 5.0 or less, and more preferably in the range of 0.8 or more to 2.0 or less. Subsequently, the slurry is uniformly applied to the anode collector by the same method as the cathode mixture, and dried at a high temperature to remove the solvent, thus an anode active material layer 2a is formed.

In the same manner as the cathode 1, the anode 2 has an anode terminal 5b which is connected to one end of a cathode collector by spot welding or ultrasonic welding. The anode terminal 5b may not be metal as long as it is electrochemically and chemically stable and electrically conductive. Examples of the material of the cathode terminal 5b include copper and nickel.

The cathode terminal 5a and anode terminal 5b are preferably derived from the same direction, but may be derived from any directions as long as no short-circuit or other problems occur and the battery performance is acceptable. The place and method to connect the cathode terminal 5a and anode terminal 5b are not limited to above examples as long as electrical contact is established.

[Battery Assembling Step]

A gel electrolyte layer is formed on the surface of the cathode 1 and anode 2, thereafter they are laminated via a separator 3b and wound, and thus a battery element 7 is assembled. The battery element 7 is armored with a laminate film 8 by folding the film, and sealed by heat fusing the periphery of the battery element 7. Thus, a nonaqueous electrolyte secondary battery 10 is assembled. When the nonaqueous electrolyte secondary battery 10 is charged to, for example, 4.25 V or higher, it has a higher open circuit voltage than batteries of the past. However, in case of abnormal heat generation in the battery, the anode having the above-described structure immediately stabilizes the inside of the battery, and prevents the decrease in the battery capacity and the deterioration of the battery characteristic.

(2) Second Embodiment

Figure 5:
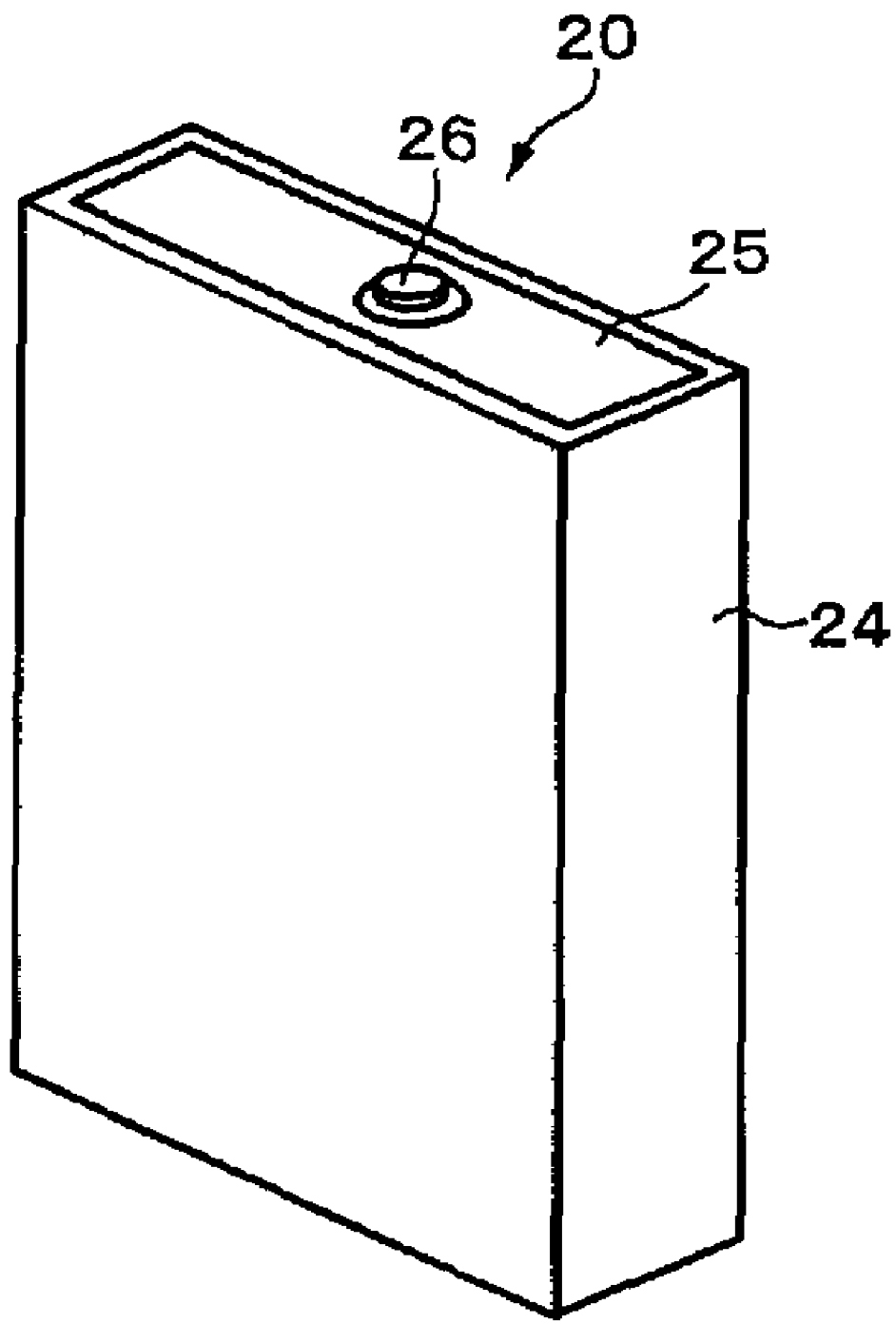
FIG. 5 is a schematic view showing the appearance of a nonaqueous electrolyte secondary battery according to a second embodiment.
Figure 6:
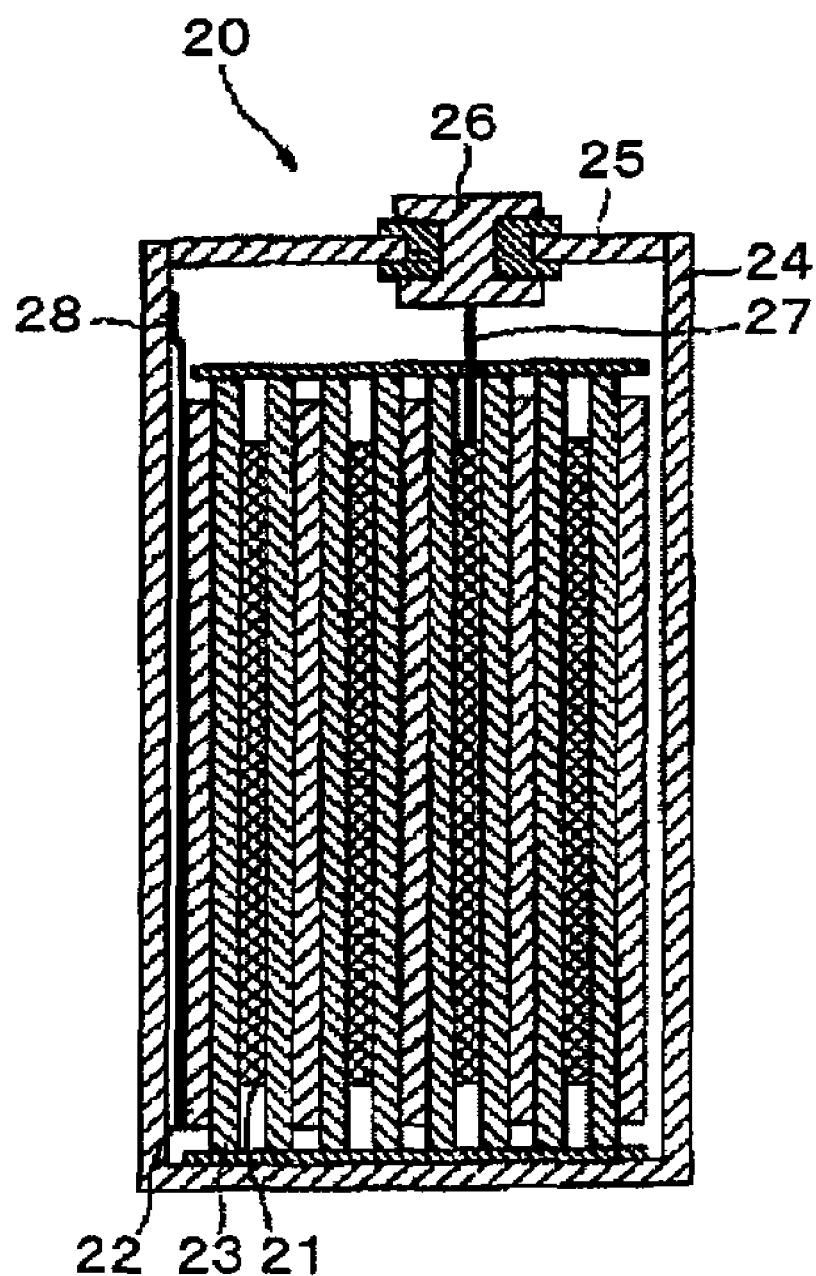
FIG. 6 is a cross-sectional view showing the structure of a nonaqueous electrolyte secondary battery according to the second embodiment.

As shown in FIGS. 5 and 6, the nonaqueous electrolyte secondary battery 20 according to the second embodiment is of so-called rectangular type, in which a strip cathode 21 and a strip anode 22 are laminated via a separator 23, and wound in a longitudinal direction to make a elliptical battery element, and the battery element is accommodated in a battery can 24, and a nonaqueous electrolytic solution is injected into the battery can 24. The battery can 24 has an closed end and an open end, and the opening of the battery can 24 is sealed with a battery cap 26.

A cathode terminal 27 derived from a cathode 21 is connected to a terminal pin 26, and an anode terminal 28 derived from the anode 22 is connected to the battery can 24. Accordingly, in the nonaqueous electrolyte secondary battery 20, the battery can 24 is an anode terminal, and the terminal pin 26 is a cathode terminal.

The battery can 24 and battery cap 26 may be made of, for example, iron or aluminum. However, when the battery can 24 and battery cap 26 are made of aluminum, for preventing the reaction between lithium and aluminum, the cathode terminal 27 should be welded to the battery can 24, and the anode terminal 28 should be connected to the terminal pin 26.

The cathode 21, anode 22, separator 23, cathode terminal 27, and anode terminal 28 each correspond to the cathode 1, anode 2, cathode terminal 5a, and anode terminal 5b in the first embodiment.

[Electrolytic Solution]

The electrolytic solution may be a nonaqueous electrolytic solution prepared by dissolving an electrolyte salt in a nonaqueous solvent. The electrolytic solution has the same components (more specifically, liquid solvent and electrolyte salt) as the first embodiment.

The nonaqueous electrolyte secondary battery used in the second embodiment is designed to have a high charged voltage of 4.25 V or higher to 6.00 V or lower, more preferably 4.30 V or higher to 4.55 V or lower from the viewpoint of achieving a high energy density and inhibiting the deterioration by oxidation. The nonaqueous electrolyte secondary battery 20 according to the second embodiment is made, for example, as described below.

[Battery Assembling Step]

The cathode 21 and anode 22 made in the same manner as the first embodiment are wound via the separator 23 in a longitudinal direction to make an elliptical battery element. The tip of the cathode terminal 27 is welded to the terminal pin 26, and the tip of the anode terminal is welded to the battery can 24. The battery element is sandwiched between a pair of insulating plates, and accommodated in the rectangular battery can 24.

Subsequently, the electrolytic solution is injected into the battery can 24, the separator 23 is impregnated with the electrolytic solution, and the inlet is sealed with the battery cap 26. Thus, the nonaqueous electrolyte secondary battery 20 according to the second embodiment is made. When the nonaqueous electrolyte secondary battery 20 is charged to, for example, 4.25 V or higher, it has a higher open circuit voltage than batteries in the past. However, in case of abnormal heat generation in the battery, the anode 21 made in the same manner as the first embodiment, more specifically the anode mixture containing aluminum oxide immediately stabilizes the inside of the battery, and prevents the decrease in the battery capacity and the deterioration of the battery characteristic.

(3) Third Embodiment

Figure 7:
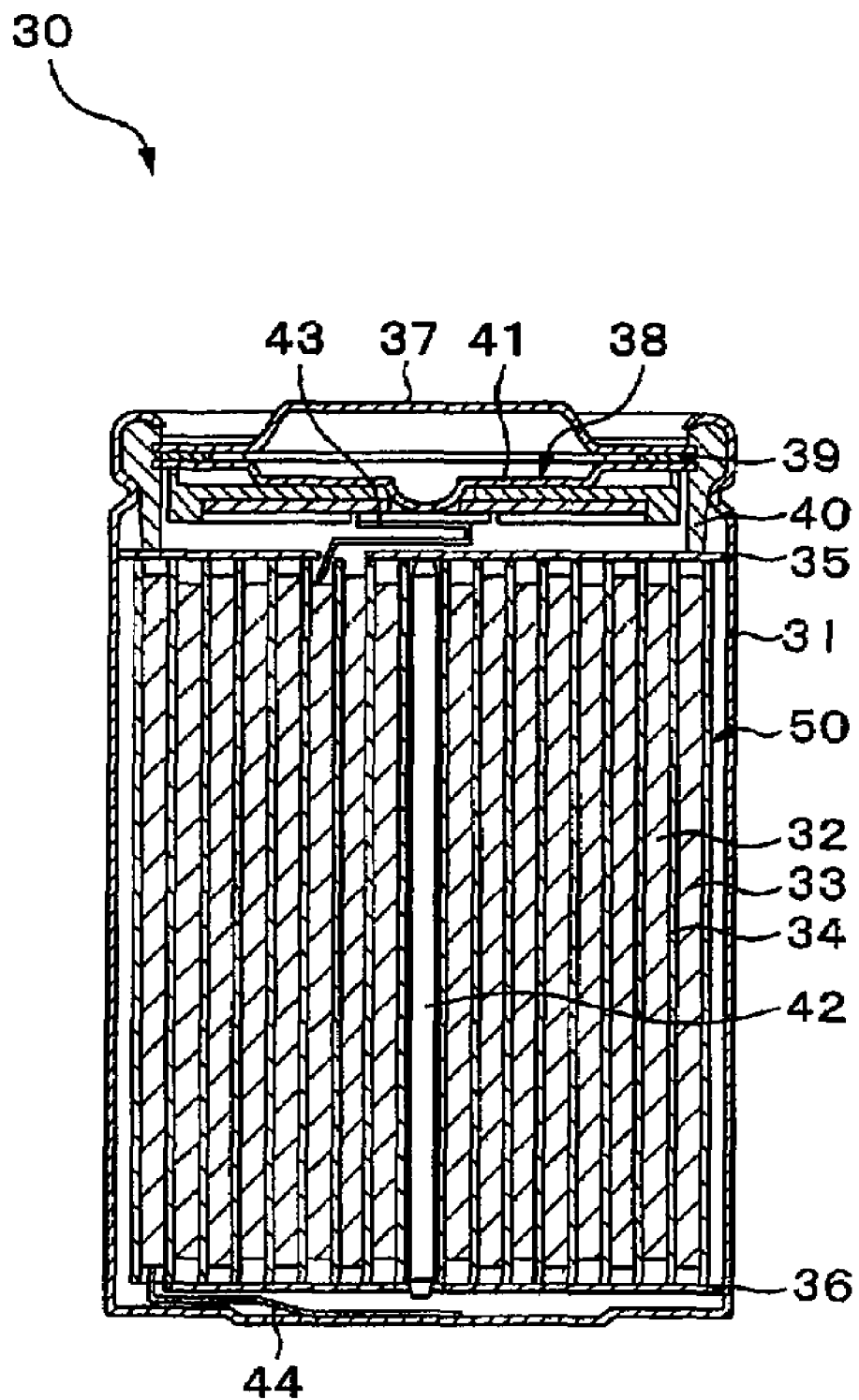
FIG. 7 is a cross-sectional view showing the structure of a nonaqueous electrolyte secondary battery according to a third embodiment.

FIG. 7 shows a sectional structure of a nonaqueous electrolyte secondary battery 30 according to a third embodiment. The nonaqueous electrolyte secondary battery 30 is of so-called cylinder type, and has a wound electrode assembly 50 including a strip cathode 32 and a strip anode 33 which are wound via a separator 34 within a substantially hollow cylindrical battery can 31.

The nonaqueous electrolyte secondary battery 30 used in the third embodiment is designed such that the open circuit voltage of a single cell in a fully charged state is preferably 4.25 V or higher to 6.00 V or lower, more preferably 4.30 V or higher to 4.55 V or lower.

In this case, the fully charged state means that the final state of charging at a current value of 0.5 C or lower or under a constant current–constant voltage system (in the constant voltage region, the voltage is cut off at a current value of 0.1 C or lower). C means charging current value (mA)/battery capacity or electrode capacity (mA). The charging potential of the cathode in a fully charged state is measured, for example, as follows: a hole for passing through an electrolytic solution is bored in a battery, and the battery is immersed in a test cell containing an electrolytic solution, and the charged voltage is measured with lithium as the reference electrode.

When the anode active material is, for example, a carbon material wherein the charged voltage of the anode 33 in a fully charged state is 0.1 V (vs. Li/Li+), the lithium ion secondary battery according to the third embodiment is preferably charged, for example, to a charge cutoff voltage of 4.35 V or higher.

The battery can 31 includes, for example, nickel Ni-plated iron Fe, and has a closed end and an open end. In the battery can 31, a pair of insulating plates 35 and 36 is disposed sandwiching the wound electrode assembly 50 in a direction perpendicular to the winding surface.

A battery cap 37 having therein a safety valve device 38 and a heat sensitive resistive element (PTC element: positive temperature coefficient element) 39 is attached to the open end of the battery can 31 by being crimped via a gasket 40, thereby the inside of the battery can 31 is tightly closed. The battery cap 37 includes, for example, the same material as the battery can 31. The safety valve device 38 is electrically connected to the battery cap 37 via a heat sensitive resistive element 39, thereby a disk plate 41 is reversed to cutoff the electrical connection between the battery cap 37 and wound electrode assembly 50 when the internal pressure of the battery becomes a predetermined value or higher by internal short-circuit or outside heating. The heat sensitive resistive element 39 limits the current when the resistance value thereof is increased by the increase in the temperature, and thereby prevents abnormal heat generation caused by a large current. The gasket 40 includes, for example, an insulating material, and the surface thereof is coated with asphalt.

The wound electrode assembly 50 is, for example, wound around a center pin 42. A cathode terminal 43 is connected to the cathode 32 of the wound electrode assembly 50, and an anode terminal 44 is connected to the anode 33. The cathode terminal 43 is electrically connected to the battery cap 37 by being welded to the safety valve device 38, and the anode terminal 44 is welded to and electrically connected to the battery can 31.

Figure 8:
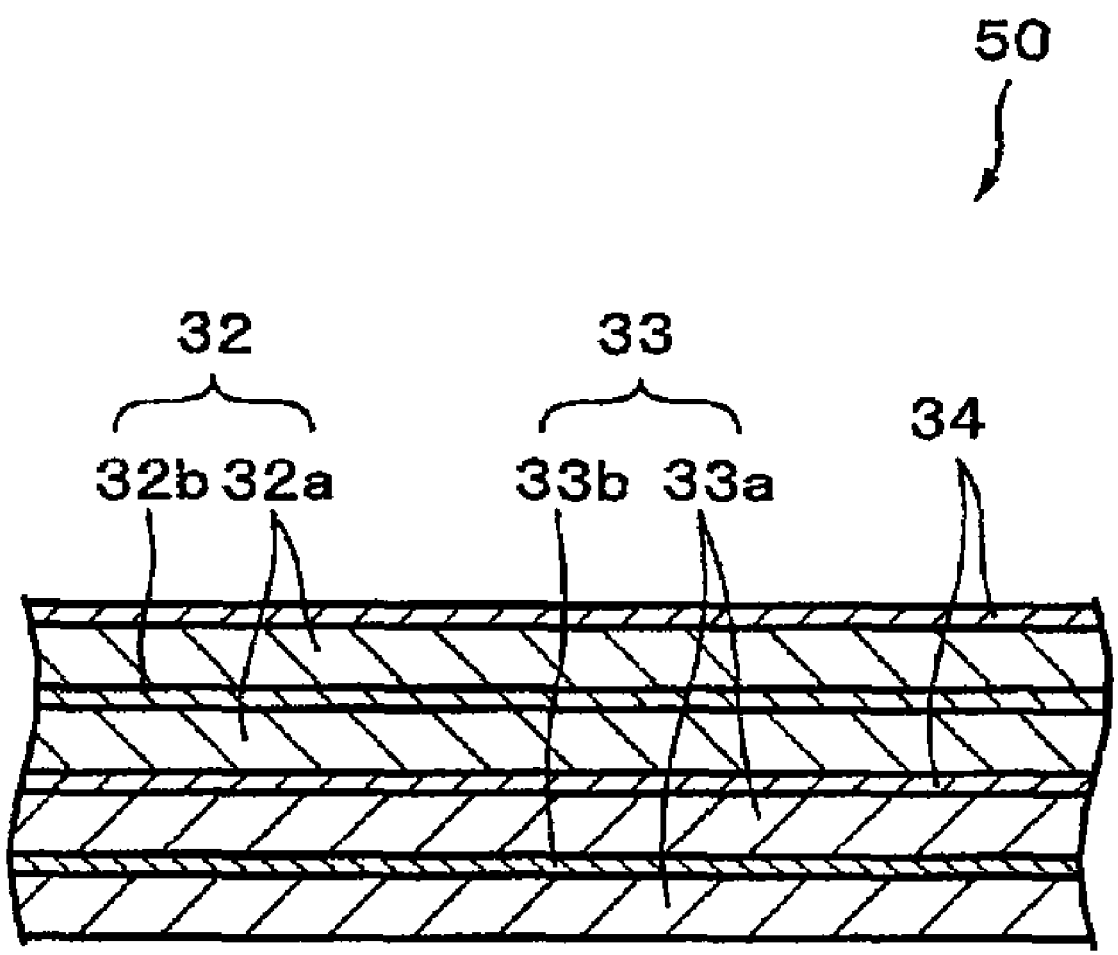
FIG. 8 is an enlarged cross-sectional view showing a portion of a wound electrode assembly shown in FIG. 7.

FIG. 8 is an enlarged view of a part of the wound electrode assembly 50 shown in FIG. 7. As shown in FIG. 8, the cathode 32 has a structure, for example, in which cathode active material layers 32a are provided on both the surfaces of a strip cathode collector 32b. The anode 33 has a structure in which anode active material layers 33a are provided on both the surfaces of a strip anode collector 33b. The cathode 32 and anode 33 are opposed via a separator 34.

[Cathode]

The cathode 32 is made by forming the cathode active material layers 32a containing a cathode active material on the surfaces of the cathode collector 32b. The cathode collector 32b may be, for example, a metal foil such as an aluminum Al foil, nickel Ni foil, or stainless steel SUS foil.

The cathode active material may be a lithium-containing compound. Preferable examples of the lithium-containing compound include lithium oxide, lithium sulfide, and intercalation compounds containing lithium. These compounds may be used in combination of two or more of them. For example, the cathode active material preferably contains a lithium complex oxide represented by the general formula: $Li_pNi_{(1-q-r)}Mn_qM1_rO_{(2-y)}X_z$ (wherein M1 represents at least one selected from Groups 2 to 15 elements excluding Ni and Mn, X represents at least one selected from Groups 16 and 17 elements excluding oxygen O, $0 \leq p \leq 1.5$, $0 \leq q \leq 1.0$, $0 \leq r \leq 1.0$, $-0.10 \leq y \leq 0.20$, and $0 \leq z \leq 0.2$).

Specific examples of the lithium complex oxide include followings.

$$Li_aCo_{1-x}Me_xO_{2-b} \qquad \text{[Formula 3]}$$

$$Li_aNi_{1-x}Me_xO_{2-b} \qquad \text{[Formula 4]}$$

$$Li_aMn_{1-x}Me_xO_{2-b} \qquad \text{[Formula 5]}$$

(In the formulae 3 to 5, Me represents at least one or two or more metal elements selected from vanadium V, copper Cu, zirconium Zr, zinc Zn, magnesium Mg, aluminum Al, and iron Fe, $0.9 \leq a \leq 1.1$, $0 \leq x \leq 0.3$, and $-0.1 \leq b \leq 0.1$.)

$$Li_aNi_{1-x-y}Co_xMe_yO_{2-b} \qquad \text{[Formula 6]}$$

$$Li_aNi_{1-x-y}Mn_xMe_yO_{2-b} \qquad \text{[Formula 7]}$$

$$Li_aCo_{1-x-y}Mn_xMe_yO_{2-b} \qquad \text{[Formula 8]}$$

(In the formulae 6 to 8, Me represents at least one or two or more metal elements selected from vanadium V, copper Cu, zirconium Zr, zinc Zn, magnesium Mg, aluminum Al, and iron Fe, $0.9 \leq a \leq 1.1$, $0 \leq x \leq 0.05$, $0 \leq y \leq 0.05$, and $-0.1 \leq b \leq 0.1$.)

$$Li_aNi_{1-x-y-z}Co_xMn_yMe_zO_{2-b} \qquad \text{[Formula 9]}$$

(In the formula 9, Me represents at least one or two or more metal elements selected from vanadium V, copper Cu, zirconium Zr, zinc Zn, magnesium Mg, aluminum Al, and iron Fe, $0.9 \leq a \leq 1.1$, $0 < x < 0.4$, $0 < y < 0.4$, $0 < z < 0.3$, and $-0.1 \leq b \leq 0.1$.)

Among the above lithium complex oxides, preferable are a lithium-cobalt complex oxide represented by the formula 3, and a lithium-cobalt-nickel-manganese complex oxide represented by the formula 6.

The lithium-cobalt complex oxide represented by the formula 3 has a R-3m rhombohedron structure. For improving the discharge/charge cycle durability and discharge characteristic, the lithium-cobalt complex oxide may be mixed with a metal such as calcium Ca, magnesium Mg, titanium Ti, tantalum Ta, niobium Nb, zirconium Zr, hafnium Hf, aluminum Al, or cobalt Co in an amount of 0.001 to 5% by atom ratio to make, for example, a lithium-cobalt-aluminum complex oxide or lithium-cobalt-aluminum-magnesium complex oxide.

The lithium-cobalt-nickel-manganese complex oxide represented by the formula 4 preferably has a R-3m rhombohedron structure. In the formula 2, if (1−x−y−z) is less than 0.20, it is unpreferably difficult to form a stable R-3m rhombohedron structure. In the formula 4, if (1−x−y−z) is unpreferably more than 0.60, the level of safety decreases. In the formula 4, y is most preferably 0.25 to 0.55. In the formula 4, a is $0.9 \leq a \leq 1.2$ for developing a capacity.

The lithium-nickel-cobalt-manganese complex oxide represented by the formula 4 may be combined with either atoms selected from Fe, Cr, and Al for the purpose of enhancing the discharge/charge cycle durability, safety, and capacity. The amount of Me atoms to be added, which is represented by z, is 0 to 0.2, preferably 0.01 to 0.18, and more preferably 0.05 to 0.16.

Further, the cathode active material is preferably a mixture of the lithium-cobalt complex oxide represented by the formula 3 and the lithium-cobalt-nickel-manganese complex oxide represented by the formula 6. The reason is that the mixture can be used to a higher charged region, and offers a high filling rate, which allows to achieve a higher discharge capacity per unit volume. In addition, the battery performance has better balance between the capacity and safety as compared with the case where the above lithium transition metal complex oxides are each used alone. Further, the battery performance has larger capacity, safety, and discharge/charge cycle stability as compared with the case using a cathode active material containing a single lithium transition metal complex oxide at the same content of the transition metal element as the mixture.

The reason why the mixture of the lithium-cobalt complex oxide represented by the formula 3 and the lithium-cobalt-nickel-manganese complex oxide represented by the formula 6 is superior to single substances is not evident, but is considered that the mixture has a synergistic effect of the lithium-nickel-cobalt-manganese complex oxide represented by the formula 6 which offers a remarkably high level of safety and develops a relatively larger capacity.

When the mixture powder of the lithium-cobalt complex oxide represented by the formula 3 and the lithium-cobalt-nickel-manganese complex oxide represented by the formula 6 is press-filled alone under a pressure of 1 t/cm$^2$, the powder pressing density is preferably 3.0 g/cm$^3$ or more, and more preferably 3.20 g/cm$^3$. When a collector aluminum foil is coated with a slurry of the mixture, dried, and pressed, it has a larger capacity per volume.

A powder pressing density of 3.0 g/cm$^3$ or higher is achieved by optimizing the particle diameter distribution of the mixture powder. More specifically, a higher powder pressing density is achieved when the particle diameter distribution is wide, the volume fraction of small particles is 20% to 50%, and the particle diameter distribution of large particles is narrowed.

The BET specific surface area of the cathode active material is preferably 0.05 m$^2$/g to 10.0 m$^2$/g, and more preferably 0.1 m$^2$/g to 5.0 m$^2$/g. When the surface area is within the range, reaction between the cathode active material and electrolyte at a high potential is inhibited.

The lithium complex oxide may be prepared by a known method, and specific examples thereof include a method of heating a mixture of a lithium compound and a metal compound, and a wet method of reacting a lithium compound with a metal compound in a solution.

The conductive agent may be, for example, a carbon-based conductive agent such as acetylene black, graphite, or Ketjen Black. The conductive agent preferably has an electric conductivity of 5.0×10$^5$ S/m or higher.

The binding agent may contain, for example, a polyacrylnitrile-based resin. Examples of the polyacrylnitrile-based resin include copolymers of nitryl compounds such as poly(meth)acrylonitrile and alkyl (meth)acrylates such as methyl (meth)acrylate, ethyl (meth)acrylate, butyl (meth)acrylate, isobutyl (meth)acrylate, 2-ethylhexyl (meth)acrylate, lauryl (meth)acrylate, and cyclohexyl (meth)acrylate, hydroxyalkyl (meth)acrylate such as cycloalkyl (meth)acrylate, 2-hydroxylethyl (meth)acrylate, and 2-hydroxypropyl (meth)acrylate, aminoalkyl (meth)acrylate such as aminomethyl (meth)acrylate, N-methylamino methyl(meth)acrylate, and N,N-diethylaminoethyl (meth)acrylate, styrenic monomers such as methacrylic acid, acrylic acid, styrene vinyl toluene, and α-methyl styrene, vinyl derivatives such as vinyl chloride, vinylidene chloride, vinyl acetate, and isopropenyl acetate, and unsaturated dibasic acids such as maleic acid and fumaric acid. These resins are used alone or in combination of two or more of them.

The binding agent preferably contains a vinylidene fluoride-based polymer.

Vinylidene fluoride-based polymer includes, for example, homopolymer of vinylidene fluoride, copolymer of vinylidene fluoride, and modified derivatives thereof. The intrinsic viscosity of the vinylidene fluoride-based polymer is preferably in the range of 1.7 dl/g to 20 dl/g, more preferably 2.0 dl/g to 15 dl/g.

The proportion of the binding agent in the cathode mixture is, for example, 1% to 7% by mass, and preferably 2% to 5% by mass. If the proportion is 1% by mass or less, the binding capacity may be insufficient to fix the active material to the collector. If 7% by mass or more, the binder devoid of electron and ion conductivity may cover the cathode active material to hinder prompt discharging and charging.

[Anode]

The anode 33 is made by forming the anode active material layer 33a containing an anode active material, aluminum oxide, a conductive agent, and a binding agent on the surface of the anode collector 33b. The anode collector 33b contains, for example, a metal foil such as a copper Cu foil, nickel foil, or stainless steel foil.

The anode active material may be, for example, a carbon material, metal compound, oxide, sulfide, lithium nitride such as LiN$_3$, lithium metal, a metal forming an alloy with lithium, or polymer material.

Examples of the carbon material include non-easy-graphitizable carbon, easy-graphitizable carbon, graphite, pyrolytic carbons, cokes, glassy carbons, sintered bodies of organic polymer compounds, carbon fiber, or activated carbon. Examples of cokes include pitch cokes, needle cokes, and petroleum cokes. Sintered bodies of organic polymer compounds refer to materials obtained by sintering a polymer material such as a phenolic resin or furan resin at a proper temperature for carbonization, and some of them are classified as non-easy-graphitizable carbon or easy-graphitizable carbon.

Examples of the polymer material include polyacetylene and polypyrrole. Among the anode materials capable of doping/dedoping lithium, preferable are those having a discharging/charging potential relatively close to that of a lithium metal. This is because the energy density of a battery is more readily increased as the discharging/charging potential of the anode decreases. Carbon materials are particularly preferable because their crystal structure scarcely changes during discharging and charging, which allows to achieve a high discharge/charge capacity and favorable cycling characteristic. Graphite is particularly preferable because it has a large electrochemical equivalent for achieving a higher energy density. Non-easy-graphitizable carbon is also preferable because it offers an excellent cycle characteristic.

The anode material capable of doping/dedoping lithium may be a simple substance of a lithium metal, a simple substance, alloy, or compound of a metal element or semimetal element capable of forming an alloy with lithium. These materials are preferable for achieving a high energy density, and more preferably combined with a carbon material for achieving a high energy density and excellent cycling characteristic.

In the present description, the term alloy includes alloys of two or more metal elements, and additionally, alloys of one or more metal elements and one or more semimetal elements. The structure may be mixed crystal, eutectic crystal (eutectic mixture), intermetallic, or mixture of two or more of them.

Examples of the metal element or semimetal element include tin Sn, lead Pb, aluminum, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, and hafnium Hf.

Examples the alloy or compound of above elements include those represented by the chemical formula $Ma_sMb_tLi_u$ or $Ma_pMc_qMd_r$. In these chemical formula, Ma represents at least one of metal elements and semimetal elements capable of forming an alloy with lithium, Mb represents at least one of metal elements and semimetal elements excluding lithium and Ma, Mc represents at least one nonmetal element, Md represents at least one of metal elements and semimetal elements excluding Ma, $s>0$, $t\geqq0$, $u\geqq0$, $p>0$, $q>0$, and $r\geqq0$.

Among them, a simple substance of a metal element or semimetal element of Group 4B in the short form periodic table, or an alloy or compound thereof is preferable, and silicon or tin, or an alloy or compound thereof are most preferable. They may be crystal or amorphous.

The conductive agent for the anode is not particularly limited as long as it is an electronic conductive material, and examples thereof include graphite such as artificial graphite and exfoliated graphite, carbon black such as acetylene black, Ketjen Black, channel black, and furnace black, conductive fibers such as carbon fiber and metal fiber, metal powders such as copper and nickel, and organic conductive agents such as polyphenylene derivatives. These agents may be used alone or as a mixture. Among these conductive agents, acetylene black, Ketjen Black, and carbon fiber are particularly preferable. The amount of the conductive agent to be added is not particularly limited, but preferably 0.1 to 30 parts by mass, more preferably 0.5 to 10 parts by mass with reference to 100 parts by mass of the anode active material. The electric conductivity of these conductive agents is preferably $5.0\times10^5$ S/m or higher.

The binding agent for the anode is preferably, for example, polytetrafluoroethylene, polyvinylidene fluoride, styrene butadiene copolymer (SBR), or CMC (carboxymethyl cellulose).

Aluminum oxide contained in the anode serves as a heat spreader. In the same manner as the first embodiment, the aluminum oxide to be used has an average particle diameter of 0.1 μm or more to 5.0 μm or less, preferably 0.1 μm or more to 3.0 μm to less. The content of aluminum oxide in the anode mixture is 1.5% or more to 10% or less by weight, and preferably 3% or more to 5% or less by weight. The volume ratio of aluminum oxide to the conductive agent is preferably 0.8 or more to 5.0 or less, and more preferably 0.8 or more to 2.0 or less.

The anode collector 33b is not particularly limited as long as it is an electronic conductive body which causes no chemical change in the assembled battery. Examples of the material include a stainless steel, nickel, copper, and titanium. Among them, copper is preferable. The thickness is not particularly limited, but preferably in the range of 1 μm to 100 μm, and more preferably in the range of 5 μm to 30 μm.

[Electrolytic Solution]

The electrolytic solution may be a nonaqueous electrolytic solution prepared by dissolving an electrolyte salt in a nonaqueous solvent. The nonaqueous solvent preferably contains, for example, at least either of ethylene carbonate and propylene carbonate for improving the cycling characteristic, and also preferably contains, for example, a mixture of ethylene carbonate and propylene carbonate for further improving the cycling characteristic.

Further, the nonaqueous solvent preferably contains at least one of chain (carbonate, etc.) such as diethyl carbonate, dimethyl carbonate, ethyl methyl carbonate and methylpropyl carbonate for further improving the cycling characteristic.

Further, the nonaqueous solvent preferably contains at least either of 2,4-difluoroanisole and vinylene carbonate, because 2,4-difluoroanisole enhances the discharge capacity, and vinylene carbonate further improves the cycling characteristic. Particularly, A mixture of them is more preferable for improving both the discharge capacity and cycling characteristic.

Further, the nonaqueous solvent may contain one or two or more of butylene carbonate, γ-butyrolactone, γ-valerolactone, derivatives thereof in which some or all of their hydrogen groups are substituted with fluorine groups, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxy propylonitrile, N,N-dimethyl formamide, N-methyl pyrrolidinone, N-methyl oxazolidinone, N,N-dimethyl imidazolidinone, nitromethane, nitroethane, sulfolane, dimethyl sulfoxide, and trimethyl phosphate.

Further, for some electrodes, reversibility of the electrode reaction may be improved by the use of derivatives of the substances included in the above nonaqueous solvent group in which some or all of the hydrogen atoms are substituted with fluorine atoms. Accordingly, these substances may be used as appropriate as the nonaqueous solvent.

The lithium salt as the electrolyte may be, for example, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, LiBr. These salts may be used alone or in combination of two or more of them.

Among them, as a lithium salt, $LiPF_6$ is preferable for achieving high ion conductivity and improving the cycling characteristic. For example, aluminum as a cathode collector is readily dissolved when the battery is charged to a high voltage, but in the presence of $LiPF_6$, $LiPF_6$ is decomposed to form a film on the aluminum surface to inhibit the dissolution of aluminum.

[Separator]

The separator 34 may be an insulating microporous membrane having a high level of ion permeability and a predetermined mechanical strength. The membrane preferably has a function of closing the pores at a predetermined temperature or above for increasing the resistance. Specific examples thereof include hydrophobic sheets resistant to organic solvents made of an olefin-based polymer such as polypropylene or polyethylene, glass fiber, nonwoven or woven fabric.

According to the third embodiment, the open circuit voltage in a fully charged state is preferably 4.25 V or higher. In view of this, the surface of the separator 34 in contact with the electrode is preferably polypropylene. Specifically, the separator 34 may be a separator having a three-layer structure in which polypropylene, polyethylene, and polypropylene are laminated in this order. When the separator 34 in contact with the electrode is, for example, a mixture of polyethylene and polypropylene, the proportion of polypropylene is preferably higher than that of polyethylene.

Further, the pore diameter of the separator 34 is preferably in the range which does not pass through the cathode active material, anode active material, conductive agent, and binder desorbed from the cathode 32 or anode 33. Specifically, the pore diameter of the separator 34 is, for example, preferably 0.01 μm to 1 μm.

Further, the thickness of the separator 34 is preferably 10 μm to 300 μm, and more preferably 15 μm to 30 μm. The porosity of the separator 34 is selected according to the electron and ion permeability, material, and film thickness. The porosity of the separator 34 is preferably 30% to 80%, and more preferably 35% to 50%.

The nonaqueous electrolyte secondary battery 30 according to the third embodiment is made, for example, as described below.

[Cathode Making Step]

The cathode 32 is made as described below. In the first place, for example, a cathode active material, a conductive agent, and a binding agent are mixed to make a cathode mixture, and the cathode mixture is dispersed into a solvent such as 1-methyl-2-pyrrolidone to make a cathode mixture slurry.

Subsequently, the cathode mixture slurry is applied to a cathode collector 32b having a conductive layer, dried to remove the solvent, and then compression molded with a roll pressing machine or the like to form a cathode active material layer 32a. Thereafter, a cathode terminal 43 is attached to the cathode collector 32b by, for example, being welded to make a cathode 32. Examples of the material of the cathode terminal 43 include aluminum.

[Anode Making Step]

The anode 33 is assembled as described below. In the first place, for example, an anode active material, aluminum oxide, a binding agent, and a conductive agent are mixed to make an anode mixture, and the anode mixture is dispersed into a solvent such as 1-methyl-2-pyrrolidone to make an anode mixture slurry. Subsequently, the anode mixture slurry is applied to an anode collector 33b, dried to remove the solvent, and then compression molded with a roll pressing machine or the like to form an anode active material layer 33a. Thereafter, an anode terminal 44 is attached to the anode collector 33b by, for example, being welded to make an anode 33. Examples of the material of the anode terminal 5b include copper and nickel.

[Battery Assembling Step]

The above-described cathode 32 and anode 33 are wound via the separator 34, and the tip of the cathode terminal 43 is welded to the safety valve device 38, and the tip of the anode terminal 44 is welded to the battery can 31. The wound cathode 32 and anode 33 are sandwiched between the pair of insulating plates 35 and 36, and contained in the battery can 31.

Thereafter, the electrolytic solution is injected into the battery can 31, and the separator 34 is impregnated with the electrolytic solution. Subsequently, the battery cap 37, safety valve device 38, and heat sensitive resistive element 39 are fixed to the open end of the battery can 31 by being crimped via the gasket 40. Thus, the lithium ion secondary battery according to the third embodiment is made.

The nonaqueous electrolyte secondary battery according to the third embodiment includes an anode mixture containing aluminum oxide, thereby, for example, in case of abnormal heat generation in the battery during discharging and charging at a high charged voltage 4.25 V or higher to 6.00 V or lower, the inside of the battery is immediately stabilized, and the decrease in the battery capacity and the deterioration of the battery characteristic are prevented, which allows the combination of a favorable high energy density and reliability.

EXAMPLES

The present invention is illustrated by following examples.

A nonaqueous electrolyte secondary battery was assembled using an anode made using an anode mixture containing aluminum oxide, and subjected to (a) measurement of rated energy density, (b) measurement of load characteristic, and (c) nail penetration safety test.

Table 1 lists the constituent elements of the nonaqueous electrolyte batteries of Examples 1 to 20 and Comparative Examples 1 to 14. These examples are described in detail with reference to Table 1.

TABLE 1

| | HEAT SPREADER | | | | CONDUCTIVE MATERIAL | |
| --- | --- | --- | --- | --- | --- | --- |
| | METAL OXIDE | AVERAGE PARTICLE DIAMETER [μm] | CONTENT [wt %] | ANODE ACTIVE MATERIAL | CONDUCTIVE RAW MATERIAL | CONTENT [wt %] |
| EXAMPLE 1 | Al$_2$O$_3$ | 0.1 | 1.5 | MCMB | VGCF | 1.05 |
| EXAMPLE 2 | Al$_2$O$_3$ | 0.1 | 3 | MCMB | VGCF | 1.5 |
| EXAMPLE 3 | Al$_2$O$_3$ | 5.0 | 3 | MCMB | VGCF | 1.5 |
| EXAMPLE 4 | Al$_2$O$_3$ | 0.1 | 10 | MCMB | VGCF | 1.44 |
| EXAMPLE 5 | Al$_2$O$_3$ | 0.1 | 10 | MCMB | VGCF | 1.2 |
| EXAMPLE 6 | Al$_2$O$_3$ | 0.5 | 4 | MCMB | VGCF | 3 |
| EXAMPLE 7 | Al$_2$O$_3$ | 0.5 | 5 | MCMB | VGCF | 3 |
| EXAMPLE 8 | Al$_2$O$_3$ | 0.5 | 10 | MCMB | VGCF | 1.44 |
| EXAMPLE 9 | Al$_2$O$_3$ | 0.5 | 5 | MCMB | VGCF | 1.5 |
| EXAMPLE 10 | Al$_2$O$_3$ | 0.5 | 5 | MCMB | VGCF | 3 |
| EXAMPLE 11 | Al$_2$O$_3$ | 0.5 | 5 | MCMB | VGCF | 1.5 |
| EXAMPLE 12 | Al$_2$O$_3$ | 0.5 | 5 | MCMB | VGCF | 1.5 |
| EXAMPLE 13 | Al$_2$O$_3$ | 0.5 | 5 | MCMB | VGCF | 1.5 |
| EXAMPLE 14 | Al$_2$O$_3$ | 0.5 | 5 | MCMB | VGCF | 1.5 |
| EXAMPLE 15 | Al$_2$O$_3$ | 0.5 | 5 | MCMB | VGCF | 1.5 |
| EXAMPLE 16 | Al$_2$O$_3$ | 0.5 | 5 | COMPOSITE METAL | VGCF | 1.5 |
| EXAMPLE 17 | Al$_2$O$_3$ | 0.5 | 5 | Si | VGCF | 1.5 |
| EXAMPLE 18 | Al$_2$O$_3$ | 0.5 | 5 | CARBON MATERIAL | VGCF | 1.5 |
| EXAMPLE 19 | Al$_2$O$_3$ | 0.5 | 5 | MCMB | VGCF | 1.5 |
| EXAMPLE 20 | Al$_2$O$_3$ | 0.5 | 5 | MCMB | VGCF | 1.5 |
| COMPARATIVE EXAMPLE 1 | NONE | — | — | MCMB | VGCF | 1.5 |
| COMPARATIVE EXAMPLE 2 | NONE | — | — | CARBON CONTAINING 3 wt % ALUMINUM OXIDE | VGCF | 2.5 |

TABLE 1-continued

| | | | | | | |
|---|---|---|---|---|---|---|
| COMPARATIVE EXAMPLE 3 | Al$_2$O$_3$ | 0.5 | 0.08 | MCMB | VGCF | 1.5 |
| COMPARATIVE EXAMPLE 4 | Al$_2$O$_3$ | 0.08 | 5 | MCMB | VGCF | 1.5 |
| COMPARATIVE EXAMPLE 5 | Al$_2$O$_3$ | 5.1 | 5 | MCMB | VGCF | 1.5 |
| COMPARATIVE EXAMPLE 6 | Al$_2$O$_3$ | 0.5 | 5 | MCMB | VGCF | 3 |
| COMPARATIVE EXAMPLE 7 | Al$_2$O$_3$ | 0.5 | 1.3 | MCMB | VGCF | 1.5 |
| COMPARATIVE EXAMPLE 8 | Al$_2$O$_3$ | 0.5 | 11 | MCMB | VGCF | 1.5 |
| COMPARATIVE EXAMPLE 9 | Al$_2$O$_3$ | 0.5 | 3 | MCMB | VGCF | 2.5 |
| COMPARATIVE EXAMPLE 10 | Al$_2$O$_3$ | 0.5 | 10 | MCMB | VGCF | 1.1 |
| COMPARATIVE EXAMPLE 11 | NONE | — | — | COMPOSITE METAL | VGCF | 1.5 |
| COMPARATIVE EXAMPLE 12 | NONE | — | — | Si | VGCF | 1.5 |
| COMPARATIVE EXAMPLE 13 | NONE | — | — | CARBON MATERIAL | VGCF | 1.5 |
| COMPARATIVE EXAMPLE 14 | Al$_2$O$_3$ | 0.5 | 5 | MCMB | VGCF | 1.5 |

| | HEAT SPREADER/ CONDUCTIVE MATERIAL RATIO | FILLING RATE [%] | CHARGED VOLTAGE [V] | SEPARATOR MATERIAL | THICKNESS [μm] | ELECTROLYTE |
|---|---|---|---|---|---|---|
| EXAMPLE 1 | 0.8 | 78 | 4.25 | PE | 9 | PVdF GEL |
| EXAMPLE 2 | 1.1 | 78 | 4.25 | PE | 9 | PVdF GEL |
| EXAMPLE 3 | 1.1 | 77 | 4.25 | PE | 9 | PVdF GEL |
| EXAMPLE 4 | 4.0 | 78 | 4.25 | PE | 9 | PVdF GEL |
| EXAMPLE 5 | 4.8 | 78 | 4.25 | PE | 9 | PVdF GEL |
| EXAMPLE 6 | 0.8 | 81 | 4.25 | PE | 9 | PVdF GEL |
| EXAMPLE 7 | 1.0 | 81 | 4.20 | PE | 9 | PVdF GEL |
| EXAMPLE 8 | 4.0 | 82 | 4.25 | PE | 9 | PVdF GEL |
| EXAMPLE 9 | 1.9 | 84 | 4.50 | PE | 9 | PVdF GEL |
| EXAMPLE 10 | 1.0 | 81 | 4.55 | PE | 9 | PVdF GEL |
| EXAMPLE 11 | 1.9 | 84 | 4.40 | PE | 9 | LIQUID |
| EXAMPLE 12 | 1.9 | 84 | 4.40 | PP/PE/PP | 15 | LIQUID |
| EXAMPLE 13 | 1.9 | 84 | 4.40 | PP/PE/PP | 15 | PVdF GEL |
| EXAMPLE 14 | 1.9 | 84 | 4.50 | PE | 9 | PVdF GEL |
| EXAMPLE 15 | 1.9 | 84 | 4.35 | PE | 9 | PVdF GEL |
| EXAMPLE 16 | 1.9 | 84 | 4.35 | PE | 9 | PVdF GEL |
| EXAMPLE 17 | 1.9 | 84 | 4.35 | PE | 9 | PVdF GEL |
| EXAMPLE 18 | 1.9 | 81 | 4.35 | PE | 9 | PVdF GEL |
| EXAMPLE 19 | 1.9 | 84 | 4.40 | PE | 9 | PVdF GEL |
| EXAMPLE 20 | 1.9 | 84 | 4.40 | PVdF-COATED PE | 9 | LIQUID |
| COMPARATIVE EXAMPLE 1 | — | 75 | 4.25 | PE | 9 | PVdF GEL |
| COMPARATIVE EXAMPLE 2 | — | 70 | 4.20 | PE | 9 | PVdF GEL |
| COMPARATIVE EXAMPLE 3 | 0.03 | 81 | 4.20 | PE | 9 | PVdF GEL |
| COMPARATIVE EXAMPLE 4 | 1.9 | 73 | 4.25 | PE | 9 | PVdF GEL |
| COMPARATIVE EXAMPLE 5 | 1.9 | 71 | 4.25 | PE | 9 | PVdF GEL |
| COMPARATIVE EXAMPLE 6 | 1.0 | 81 | 4.60 | PE | 9 | PVdF GEL |
| COMPARATIVE EXAMPLE 7 | 0.8 | 72 | 4.25 | PE | 9 | PVdF GEL |
| COMPARATIVE EXAMPLE 8 | 4.2 | 71 | 4.25 | PE | 9 | PVdF GEL |
| COMPARATIVE EXAMPLE 9 | 0.7 | 75 | 4.25 | PE | 9 | PVdF GEL |
| COMPARATIVE EXAMPLE 10 | 5.2 | 71 | 4.25 | PE | 9 | PVdF GEL |
| COMPARATIVE EXAMPLE 11 | — | 76 | 4.35 | PE | 9 | PVdF GEL |
| COMPARATIVE EXAMPLE 12 | — | 78 | 4.35 | PE | 9 | PVdF GEL |

TABLE 1-continued

| COMPARATIVE EXAMPLE 13 | — | 71 | 4.35 | PE | 9 | PVdF GEL |
|---|---|---|---|---|---|---|
| COMPARATIVE EXAMPLE 14 | 1.9 | 84 | 4.40 | PE | 9 | PEO GEL |

Example 1

[Making of Cathode]

95 wt % of lithium cobaltate $LiCoO_2$ as the cathode active material, 2 wt % of graphite as the conductive agent, and 3 wt % of polyvinylidene fluoride PVdF as the binding agent were mixed, and dispersed in N-methyl-2-pyrrolidone to make a cathode mixture slurry. Subsequently, the cathode mixture slurry was applied to both the surfaces of a cathode collector made of a strip aluminum foil having a thickness of 15 μm. Subsequently, the collector was dried, and compression molded with a roll pressing machine to form a cathode active material layer, thus a cathode was made. Thereafter, a cathode terminal made of aluminum was connected to one end of the cathode collector.

[Making of Anode]

93.45 wt % of MCMB (Meso-Carbon Micro Beads: spherical carbon fine particles) as the anode active material, 1.5 wt % of aluminum oxide having an average particle diameter of 0.1 μm as the heat spreader, 1.05 wt % of vapor grown carbon fiber (VGCF) as the conductive agent, and 4 wt % of PVdF as the binding agent were mixed, wherein the volume ratio of aluminum oxide to the conductive agent was set to 0.8. Subsequently, the anode mixture was dispersed in N-methyl-2-pyrrolidone to make an anode mixture slurry, and uniformly applied to both the surfaces of a cathode collector made of a strip nickel foil having a thickness of 12 μm. Subsequently, the collector was dried, and compression molded with a roll pressing machine to form an anode active material layer, thus an anode was made. Thereafter, an anode terminal made of nickel was connected to one end of the anode collector. The average particle diameter of the anode active material was measured by observation with using SEM.

[Making of Gelatinous Electrolyte]

Propylene carbonate PC was mixed with ethylene carbonate EC in the proportion of PC:EC=50:50 to make a mixed solvent. Subsequently, $LiPF_6$ as the electrolyte salt was dissolved in the mixed solvent at a concentration of 0.7 mol/kg to make an electrolytic solution. Subsequently, the electrolytic solution was held by PVdF copolymerized with 6.9% of hexafluoropropylene HFP to make a gelatinous electrolyte.

[Battery Assembling Step]

Further, a gelatinous electrolyte layer was formed on both the surfaces of the cathode and anode, and the cathode and anode was laminated via a separator made of polyethylene PE having a thickness of 9 μm, and wound to make a battery element. Subsequently, the battery element was armored with a laminate film, and the periphery of the battery element was sealed. Subsequently, the nonaqueous electrolyte secondary battery was charged to a voltage of 4.25 V, thus a nonaqueous electrolyte secondary battery was made.

Example 2

A nonaqueous electrolyte secondary battery was made in the same manner as in Example 1, except that the content of aluminum oxide was changed to 3 wt %, and the content of VGCF as the conductive agent used in the anode was changed to 1.5 wt %. The volume ratio of aluminum oxide to the conductive agent was set to 1.1.

Example 3

A nonaqueous electrolyte secondary battery was made in the same manner as in Example 1, except that the average particle diameter and the content of aluminum oxide used in the anode were changed to 5.0 μm and 3 wt %, respectively, and the content of VGCF as the conductive agent used in the anode was changed to 1.5 wt %. The volume ratio of aluminum oxide to the conductive agent was set to 1.1.

Example 4

A nonaqueous electrolyte secondary battery was made in the same manner as in Example 1, except that the content of aluminum oxide was changed to 10 wt %, and the content of VGCF as the conductive agent used in the anode was changed to 1.44 wt %. The volume ratio of aluminum oxide to the conductive agent was set to 4.0.

Example 5

A nonaqueous electrolyte secondary battery was made in the same manner as in Example 1, except that the content of aluminum oxide was changed to 10 wt %, and the content of VGCF as the conductive agent used in the anode was changed to 1.2 wt %. The volume ratio of aluminum oxide to the conductive agent was set to 4.8.

Example 6

A nonaqueous electrolyte secondary battery was made in the same manner as in Example 1, except that the average particle diameter and the content of aluminum oxide were changed to 0.5 μm and 4 wt %, respectively, and the content of VGCF as the conductive agent used in the anode was changed to 3 wt %. The volume ratio of aluminum oxide to the conductive agent was set to 0.8.

Example 7

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 3 wt %, and the battery was charged to a voltage of 4.20 V. The volume ratio of aluminum oxide to the conductive agent was set to 1.0.

Example 8

A nonaqueous electrolyte secondary battery was made in the same manner as in Example 1, except that the average particle diameter and the content of aluminum oxide were changed to 0.5 μm and 10 wt %, respectively, and the content of VGCF as the conductive agent used in the anode was changed to 1.44 wt %. The volume ratio of aluminum oxide to the conductive agent was set to 4.0.

Example 9

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, and the battery was charged to a voltage of 4.50 V. The volume ratio of aluminum oxide to the conductive agent was set to 1.9.

Example 10

A nonaqueous electrolyte secondary battery was made in the same manner as in Example 1, except that the average particle diameter and the content of aluminum oxide were changed to 0.5 μm and 5 wt %, respectively, and the content of VGCF as the conductive agent used in the anode was changed to 3 wt %, and the battery was charged to a voltage of 4.55 V. The volume ratio of aluminum oxide to the conductive agent was set to 1.0.

Example 11

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, the battery was charged to a voltage of 4.40 V, and a liquid electrolyte was used as the electrolyte. The volume ratio of aluminum oxide to the conductive agent was set to 1.9.

Example 12

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, the battery was charged to a voltage of 4.40 V, a three-layer separator having a thickness of 15 μm and including polyethylene PE as the base material layer and polypropylene PP as the surface layer was used, and a liquid electrolyte was injected. The volume ratio of aluminum oxide to the conductive agent was set to 1.9.

Example 13

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, the battery was charged to a voltage of 4.40 V, and the separator having a three-layer structure as Example 10 was used. The volume ratio of aluminum oxide to the conductive agent was set to 1.9.

Example 14

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, and the battery was charged to a voltage of 4.50 V. The volume ratio of aluminum oxide to the conductive agent was set to 1.9.

Example 15

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, and the battery was charged to a voltage of 4.35 V. The volume ratio of aluminum oxide to the conductive agent was set to 1.9.

Example 16

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, an alloy of tin, cobalt, indium, aluminum, silicon, and carbon (hereinafter, referred to as composite metal as appropriate) as the anode active material, and the battery was charged to a voltage of 4.35 V. The volume ratio of aluminum oxide to the conductive agent was set to 1.9.

Example 17

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, silicon Si was used as the anode active material, and the battery was charged to a voltage of 4.35 V. The volume ratio of aluminum oxide to the conductive agent was set to 1.9.

Example 18

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, a carbon was used as the anode active material, and the battery was charged to a voltage of 4.35 V. The volume ratio of aluminum oxide to the conductive agent was set to 1.9.

Example 19

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, the battery was charged to a voltage of 4.40 V, and a gelatinous electrolyte gelated with polyvinyl fluoride PVF was used as the electrolyte. The volume ratio of aluminum oxide to the conductive agent was set to 1.9.

Example 20

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, the battery was charged to a voltage of 4.40 V, and the gelatinous electrolyte was prepared after applying PVdF to the surface of the separator to make a battery element, accommodating it in a covering material, and injecting the electrolytic solution. The volume ratio of aluminum oxide to the conductive agent was set to 1.9.

Comparative Example 1

A nonaqueous electrolyte secondary battery was made in the same manner as in Example 1, except that no aluminum oxide was added, and the content of VGCF as the conductive agent used in the anode was changed to 1.5 wt %.

Comparative Example 2

A nonaqueous electrolyte secondary battery was made in the same manner as in Example 1, except that carbon containing 3 wt % of aluminum oxide was used as the anode active material, the content of VGCF as the conductive agent used in the anode was changed to 2.5 wt %, and the battery was charged to a voltage of 4.20 V. The carbon containing 3 wt % of aluminum oxide is graphite powder containing 3 wt % of aluminum prepared by vacuum depositing aluminum on graphite powder in a vapor of $10^{-4}$ torr for different deposition times, followed by heating oxidation at 1,800° C. The volume ratio of aluminum oxide to the conductive agent was set to 0.7.

Comparative Example 3

A nonaqueous electrolyte secondary battery was made in the same manner as in Example 1, except that the average particle diameter and the content of aluminum oxide were changed to 0.5 μm and 0.08 wt %, respectively, the content of VGCF as the conductive agent used in the anode was changed to 1.5 wt %, and the battery was charged to a voltage of 4.20 V. The volume ratio of aluminum oxide to the conductive agent was set to 0.03.

Comparative Example 4

A nonaqueous electrolyte secondary battery was made in the same manner as in Example 1, except that the average particle diameter and the content of aluminum oxide were changed to 0.08 μm and 5 wt %, respectively, and the content of VGCF as the conductive agent used in the anode was changed to 1.5 wt %. The volume ratio of aluminum oxide to the conductive agent was set to 1.9.

Comparative Example 5

A nonaqueous electrolyte secondary battery was made in the same manner as in Example 1, except that the average particle diameter and the content of aluminum oxide were changed to 5.1 μm and 5 wt %, respectively, and the content of VGCF as the conductive agent used in the anode was changed to 1.5 wt %. The volume ratio of aluminum oxide to the conductive agent was set to 1.9.

Comparative Example 6

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 3.0 wt %, and the battery was charged to a voltage of 4.60 V. The volume ratio of aluminum oxide to the conductive agent was set to 1.0.

Comparative Example 7

A nonaqueous electrolyte secondary battery was made in the same manner as in Example 1, except that the average particle diameter and the content of aluminum oxide were changed to 0.5 μm and 2 wt %, respectively, and the content of VGCF as the conductive agent used in the anode was changed to 1.5 wt %. The volume ratio of aluminum oxide to the conductive agent was set to 0.8.

Comparative Example 8

A nonaqueous electrolyte secondary battery was made in the same manner as in Example 1, except that the average particle diameter and the content of aluminum oxide were changed to 0.5 μm and 11 wt %, respectively, and the content of VGCF as the conductive agent used in the anode was changed to 1.5 wt %. The volume ratio of aluminum oxide to the conductive agent was set to 4.2.

Comparative Example 9

A nonaqueous electrolyte secondary battery was made in the same manner as in Example 1, except that the average particle diameter and the content of aluminum oxide were changed to 0.5 μm and 3 wt %, respectively, and the content of VGCF as the conductive agent was changed to 2.5 wt %. The volume ratio of aluminum oxide to the conductive agent was set to 0.7.

Comparative Example 10

A nonaqueous electrolyte secondary battery was made in the same manner as in Example 1, except that the average particle diameter and the content of aluminum oxide were changed to 0.5 μm and 10 wt %, respectively, the content of VGCF as the conductive agent was changed to 1.1 wt %. The volume ratio of aluminum oxide to the conductive agent was set to 5.2.

Comparative Example 11

A nonaqueous electrolyte secondary battery was made in the same manner as in Example 1, except that no aluminum oxide was added, the content of VGCF as the conductive agent used in the anode was changed to 1.5 wt %, the same composite metal as Example 16 was used as the anode active material, and the battery was charged to a voltage of 4.35 V.

Comparative Example 12

A nonaqueous electrolyte secondary battery was made in the same manner as in Example 1, except that no aluminum oxide was added, the content of VGCF as the conductive agent used in the anode was changed to 1.5 wt %, silicon was used as the anode active material, and the battery was charged to a voltage of 4.35 V.

Comparative Example 13

A nonaqueous electrolyte secondary battery was made in the same manner as in Example 1, except that no aluminum oxide was added, the content of VGCF as the conductive agent used in the anode was changed to 1.5 wt %, a carbon material was used as the anode active material, and the battery was charged to a voltage of 4.35 V.

Comparative Example 14

A nonaqueous electrolyte secondary battery was made in the same manner as in Example 1, except that the average particle diameter and the content of aluminum oxide were changed to 0.5 μm and 5 wt %, respectively, the content of VGCF as the conductive agent used in the anode was changed to 1.5 wt %, the battery was charged to a voltage of 4.40 V, and a gelatinous electrolyte gelated with polyethylene oxide PEO was used as the electrolyte. The volume ratio of aluminum oxide to the conductive agent was set to 1.9.

The nonaqueous electrolyte secondary batteries of Examples 1 to 20 and Comparative Examples 1 to 14 were subjected to (a) measurement of rated energy density, (b) measurement of battery swelling, and (c) nail penetration safety test.

(a) Measurement of Rated Energy Density

The nonaqueous electrolyte batteries of Examples and Comparative Examples were measured for their rated energy density. In the first place, the batteries were discharged and charged in an atmosphere having temperature of 23° C., and measured for their rated capacity. Charging was conducted by constant current-constant voltage charging at 100 mA for 15 hours up to the voltage specified in Examples and Comparative Examples. Subsequently, discharging was performed by constant current discharge at 100 mA to a cutoff voltage of 2.5 V, and the discharge capacity after the first cycle was measured and recorded as the rated capacity. Subsequently, the rated energy density was calculated from the following formula:

Rated energy density [Wh/l]=(average discharge voltage [V]×rated capacity [Ah])/battery volume [l]

(b) Measurement of Load Characteristic

The nonaqueous electrolyte batteries of Examples and Comparative Examples were each charged to a specified voltage, subsequently 3C discharged in an atmosphere having temperature of 25° C., and measured for their load characteristics. The cutoff voltage was 2.5 V.

(c) Nail Penetration Safety Test

The nonaqueous electrolyte batteries of Examples and Comparative Examples were each charged to a specified voltage. Subsequently a nail having a diameter of 2.0 mm was penetrated in the trunk of the batteries at a rate of 100 mm/sec with the temperature of the batteries kept at 25° C., and the peak temperature of the batteries were measured.

Table 2 lists the results of the above measurements.

TABLE 2

|  | NOMINAL ENERGY DENSITY [Wh/l] | LOAD CHARACTERISTIC [%] | PEAK TEMPERATURE [° C.] |
|---|---|---|---|
| EXAMPLE 1 | 494 | 89 | 87 |
| EXAMPLE 2 | 495 | 91 | 85 |
| EXAMPLE 3 | 494 | 91 | 86 |
| EXAMPLE 4 | 495 | 91 | 41 |
| EXAMPLE 5 | 495 | 86 | 45 |
| EXAMPLE 6 | 501 | 91 | 72 |
| EXAMPLE 7 | 498 | 91 | 70 |
| EXAMPLE 8 | 505 | 91 | 32 |
| EXAMPLE 9 | 531 | 91 | 95 |
| EXAMPLE 10 | 513 | 91 | 96 |
| EXAMPLE 11 | 521 | 91 | 70 |
| EXAMPLE 12 | 513 | 91 | 64 |
| EXAMPLE 13 | 511 | 91 | 61 |
| EXAMPLE 14 | 513 | 91 | 66 |
| EXAMPLE 15 | 511 | 91 | 58 |
| EXAMPLE 16 | 541 | 91 | 71 |
| EXAMPLE 17 | 564 | 91 | 82 |
| EXAMPLE 18 | 511 | 91 | 42 |
| EXAMPLE 19 | 525 | 91 | 69 |
| EXAMPLE 20 | 523 | 91 | 68 |
| COMPARATIVE EXAMPLE 1 | 488 | 91 | 125 |
| COMPARATIVE EXAMPLE 2 | 472 | 78 | 122 |
| COMPARATIVE EXAMPLE 3 | 487 | 90 | 120 |
| COMPARATIVE EXAMPLE 4 | 481 | 84 | 120 |
| COMPARATIVE EXAMPLE 5 | 478 | 82 | 121 |
| COMPARATIVE EXAMPLE 6 | 500 | 90 | THERMAL RUNAWAY |
| COMPARATIVE EXAMPLE 7 | 477 | 81 | 123 |
| COMPARATIVE EXAMPLE 8 | 481 | 80 | 125 |
| COMPARATIVE EXAMPLE 9 | 492 | 84 | 123 |
| COMPARATIVE EXAMPLE 10 | 486 | 72 | 112 |
| COMPARATIVE EXAMPLE 11 | 535 | 90 | THERMAL RUNAWAY |
| COMPARATIVE EXAMPLE 12 | 558 | 89 | THERMAL RUNAWAY |
| COMPARATIVE EXAMPLE 13 | 506 | 78 | THERMAL RUNAWAY |
| COMPARATIVE EXAMPLE 14 | 478 | 75 | THERMAL RUNAWAY |

In Table 2, a rated energy density of 490 Wh/l or more, a load characteristic of 85% or more, and a peak temperature of 100° C. or lower in the nail penetration safety test were each regarded as acceptable.

As shown by the comparison between Examples 2, 3, 4, and 8 with Comparative Example 1, when an appropriate amount of aluminum oxide was added to a battery including MCMB as the anode active material and 1.5 wt % of VGCF as the anode conductive agent and having a charged voltage of 4.25 V, the temperature rise in the battery was inhibited. As shown by Examples 16 to 18 and Comparative Examples 11 to 13, even when the other anode active materials were used, the addition of an appropriate amount of aluminum oxide inhibited the temperature rise in the battery.

As shown by Examples 2 and 3 and Comparative Examples 4 and 5, when the average particle diameter of aluminum oxide was 0.1 μm or more to 5.0 μm or less, the decrease in the rated energy density and load characteristic was prevented, and the temperature rise in the battery was inhibited.

As shown by Examples 1 and 5 and Comparative Examples 3 and 8, when the content of aluminum oxide is 1.5 wt % or more to 10 wt % or less, the decrease in the rated energy density and load characteristic was prevented, and the temperature rise in the battery was inhibited.

As shown by Examples 1, 5, and 6 and Comparative Examples 9 and 10, when the volume ratio of aluminum oxide to the conductive agent was set to 0.8 or more to 5.0 or less, the decrease in the rated energy density and load characteristic was prevented, and the temperature rise in the battery was inhibited.

Tables 3 and 4 list the constituent elements of the nonaqueous electrolyte batteries of Examples 21 to 32 and Comparative Examples 15 to 21. These examples are further described in detail with reference to Tables 3 and 4.

TABLE 3

| | HEAT SPREADER | | | | |
| --- | --- | --- | --- | --- | --- |
| | METAL OXIDE | AVERAGE PARTICLE DIAMETER [μm] | CONTENT [wt %] | ANODE ACTIVE MATERIAL | BINDING MATERIAL |
| EXAMPLE 21 | $Al_2O_3$ | 0.5 | 1.5 | MCMB | PVdF |
| EXAMPLE 22 | $Al_2O_3$ | 0.1 | 10 | MCMB | PVdF |
| EXAMPLE 23 | $Al_2O_3$ | 0.2 | 5 | MCMB | PVdF |
| EXAMPLE 24 | $Al_2O_3$ | 0.5 | 5 | HIGHLY GRAPHITIZED GRAPHITE | CMC + SBR |
| EXAMPLE 25 | $Al_2O_3$ | 0.5 | 3 | MCMB | PVdF |
| EXAMPLE 26 | $Al_2O_3$ | 5 | 3 | MCMB | PVdF |
| EXAMPLE 27 | $Al_2O_3$ | 0.5 | 3 | SURFACE-MODIFIED NATURAL GRAPHITE | POLYACRYLONITRILE |
| EXAMPLE 28 | $Al_2O_3$ | 0.5 | 6.9 | POLYMER-COATED ARTIFICIAL GRAPHITE | CMC + SBR |
| EXAMPLE 29 | $Al_2O_3$ | 0.5 | 3.5 | MCMB/HIGHLY GRAPHITIZED GRAPHITE MIXTURE | CMC + SBR |
| EXAMPLE 30 | $Al_2O_3$ | 0.5 | 3.5 | Sn/Co/CARBON MIXTURE | PVdF |
| EXAMPLE 31 | $Al_2O_3$ | 0.5 | 3.5 | Si | POLYIMIDE |
| EXAMPLE 32 | $Al_2O_3$ | 0.5 | 3.5 | CARBON MATERIAL | PVdF + POLYACRYLONITRILE |
| COMPARATIVE EXAMPLE 15 | NONE | — | — | MCMB | PVdF |
| COMPARATIVE EXAMPLE 16 | NONE | — | — | CARBON CONTAINING 3 wt % ALUMINUM OXIDE | CMC + SBR |
| COMPARATIVE EXAMPLE 17 | NONE | — | — | Sn/Co/CARBON MIXTURE | SBR |
| COMPARATIVE EXAMPLE 18 | NONE | — | — | Si | POLYIMIDE |
| COMPARATIVE EXAMPLE 19 | NONE | — | — | CARBON MATERIAL | PVdF |
| COMPARATIVE EXAMPLE 20 | $Al_2O_3$ | 0.5 | 3 | MCMB | PVdF |
| COMPARATIVE EXAMPLE 21 | $Al_2O_3$ | 0.5 | 10 | MCMB | PVdF |

| | CONDUCTIVE MATERIAL | | HEAT SPREADER/ CONDUCTIVE MATERIAL RATIO | FILLING RATE [%] |
| --- | --- | --- | --- | --- |
| | CONDUCTIVE RAW MATERIAL | CONTENT [wt %] | | |
| EXAMPLE 21 | VGCF | 1.05 | 0.8 | 84 |
| EXAMPLE 22 | VGCF | 1.2 | 4.8 | 84 |
| EXAMPLE 23 | VGCF | 2 | 1.4 | 84 |
| EXAMPLE 24 | VGCF | 1 | 2.9 | 80 |
| EXAMPLE 25 | VGCF | 2 | 0.9 | 84 |
| EXAMPLE 26 | VGCF | 2 | 0.9 | 84 |
| EXAMPLE 27 | VGCF | 0.9 | 1.9 | 81 |
| EXAMPLE 28 | VGCF | 0.8 | 4.9 | 82 |
| EXAMPLE 29 | VGCF | 1 | 2.0 | 83 |
| EXAMPLE 30 | VGCF | 1 | 2.0 | 80 |
| EXAMPLE 31 | VGCF | 1 | 2.0 | 82 |
| EXAMPLE 32 | VGCF | 1 | 2.0 | 80 |
| COMPARATIVE | VGCF | 1.5 | — | 75 |

TABLE 3-continued

| | | | | |
|---|---|---|---|---|
| EXAMPLE 15 COMPARATIVE EXAMPLE 16 | VGCF | 2.5 | — | 70 |
| COMPARATIVE EXAMPLE 17 | VGCF | 1 | — | 76 |
| COMPARATIVE EXAMPLE 18 | VGCF | 1 | — | 78 |
| COMPARATIVE EXAMPLE 19 | VGCF | 1 | — | 71 |
| COMPARATIVE EXAMPLE 20 | VGCF | 2.5 | 0.7 | 75 |
| COMPARATIVE EXAMPLE 21 | VGCF | 1.1 | 5.2 | 71 |

TABLE 4

| | CHARGED VOLTAGE [V] | SEPARATOR MATERIAL | SEPARATOR THICKNESS [μm] | ELECTROLYTE |
|---|---|---|---|---|
| EXAMPLE 21 | 4.25 | PE | 20 | LIQUID |
| EXAMPLE 22 | 4.25 | PE | 20 | LIQUID |
| EXAMPLE 23 | 4.25 | PE | 20 | LIQUID |
| EXAMPLE 24 | 4.25 | PET CONTAINING $Al_2O_3$, $SiO_2$ | 20 | LIQUID |
| EXAMPLE 25 | 4.25 | PE | 20 | LIQUID |
| EXAMPLE 26 | 4.25 | PE | 20 | LIQUID |
| EXAMPLE 27 | 4.35 | PP | 20 | LIQUID |
| EXAMPLE 28 | 4.35 | PP | 20 | LIQUID |
| EXAMPLE 29 | 4.40 | PP/PE/PP | 15 | LIQUID |
| EXAMPLE 30 | 4.20 | PP/PE/PP | 15 | LIQUID |
| EXAMPLE 31 | 4.35 | PP/PE MIXTURE | 18 | LIQUID |
| EXAMPLE 32 | 4.35 | ARAMID-CONTAINING PE | 18 | LIQUID |
| COMPARATIVE EXAMPLE 15 | 4.25 | PE | 20 | LIQUID |
| COMPARATIVE EXAMPLE 16 | 4.20 | PE | 20 | LIQUID |
| COMPARATIVE EXAMPLE 17 | 4.35 | PE | 20 | LIQUID |
| COMPARATIVE EXAMPLE 18 | 4.35 | PE | 20 | LIQUID |
| COMPARATIVE EXAMPLE 19 | 4.35 | PE | 20 | LIQUID |
| COMPARATIVE EXAMPLE 20 | 4.25 | PE | 20 | PVdF GEL |
| COMPARATIVE EXAMPLE 21 | 4.25 | PE | 20 | PVdF GEL |

Example 21

[Making of Cathode]

95 wt % of lithium cobaltate $LiCoO_2$ as the cathode active material, 2 wt % of graphite as the conductive agent, and 3 wt % of PVdF as the binding agent were mixed, and dispersed in N-methyl-2-pyrrolidone to make a cathode mixture slurry. Subsequently, the cathode mixture slurry was uniformly applied to both the surfaces of a cathode collector made of a strip aluminum foil having a thickness of 15 μm. Subsequently, the collector was dried, and compression molded with a roll pressing machine to form a cathode active material layer, thus a cathode was made. Thereafter, a cathode terminal made of aluminum was connected to one end of the cathode collector.

[Making of Anode]

93.45 wt % of MCMB (Meso-Carbon Micro Beads: spherical carbon fine particles) as the anode active material, 1.5 wt % of aluminum oxide having an average particle diameter of 0.5 μm as the heat spreader, 1.05 wt % of VGCF as the conductive agent, 4 wt % of PVdF as the binding agent were mixed, wherein the volume ratio of aluminum oxide to the conductive agent was set to 0.8. Subsequently, the cathode mixture was dispersed in N-methyl-2-pyrrolidone to make a cathode mixture slurry, and the slurry was uniformly applied to both the surfaces of an anode collector made of a strip copper foil having a thickness of 12 μm. Subsequently, the collector was dried, and compression molded with a roll pressing machine to form an anode active material layer, thus an anode was made. Thereafter, an anode terminal made of nickel was connected to one end of the anode collector.

[Preparation of Electrolytic Solution]

Ethylene carbonate and dimethyl carbonate were mixed at an weight ratio of 1:1 to make a solution, and $LiPF_6$ as the electrolyte salt was added to the solution at a concentration of 1 mol/l, thus a nonaqueous electrolytic solution was prepared.

[Battery Assembling Step]

The cathode and anode made as described above were laminated via a separator made of polyethylene PE having a thickness of 20 μm, and wound in a longitudinal direction to make an elliptical battery element. Subsequently, the elliptical battery element was inserted into a rectangular battery can having a width of 34 mm, thickness of 5.4 mm, and height of 36 mm, and a battery cap was welded to the opening of the battery can. Thereafter, the nonaqueous electrolytic solution was injected into the electrolytic solution inlet formed on the battery cap, and then the inlet was sealed. Subsequently, the nonaqueous electrolyte secondary battery was charged to a voltage of 4.25 V, thus a nonaqueous electrolyte secondary battery was made.

Example 22

A nonaqueous electrolyte secondary battery was made in the same manner as in Example 21, except that the average particle diameter and the content of aluminum oxide were changed to 0.1 μm and 10 wt %, respectively, and the content of VGCF as the conductive agent used in the anode was changed to 1.2 wt %. The volume ratio of aluminum oxide to the conductive agent was set to 4.8.

Example 23

A nonaqueous electrolyte secondary battery was made in the same manner as in Example 21, except that the average particle diameter and the content of aluminum oxide were changed to 0.2 μm and 5 wt %, respectively, and the content of VGCF as the conductive agent used in the anode was changed to 2 wt %. The volume ratio of aluminum oxide to the conductive agent was set to 1.4.

Example 24

A nonaqueous electrolyte secondary battery was made in the same manner as in Example 21, except that 93 wt % of highly graphitized graphite as the anode active material, 5 wt % of aluminum oxide having an average particle diameter of 0.5 μm as the heat spreader, 1 wt % of VGCF as the conductive agent, 1 wt % of CMC carboxymethyl cellulose as the thickening agent, and 1 wt % of styrene-butadiene copolymer SBR as the binding agent were mixed, wherein the volume ratio of aluminum oxide to the conductive agent was set to 2.9, and a separator having a thickness of 20 μm made by molding a mixture of polyethylene terephthalate PET, aluminum oxide $Al_2O_3$, and silicon oxide $SiO_2$ into a film was used.

Example 25

A nonaqueous electrolyte secondary battery was made in the same manner as in Example 21, except that the average particle diameter and the content of aluminum oxide were changed to 0.5 μm and 3 wt %, respectively, and the content of VGCF as the conductive agent used in the anode was changed to 2 wt %. The volume ratio of aluminum oxide to the conductive agent was set to 0.9.

Example 26

A nonaqueous electrolyte secondary battery was made in the same manner as in Example 21, except that the average particle diameter and the content of aluminum oxide were changed to 5.0 μm and 3 wt %, respectively, and the content of VGCF as the conductive agent used in the anode was changed to 2 wt %. The volume ratio of aluminum oxide to the conductive agent was set to 0.9.

Example 27

A nonaqueous electrolyte secondary battery was made in the same manner as in Example 21, except that 91.1 wt % of surface-modified natural graphite as the anode active material, 5 wt % of aluminum oxide having an average particle diameter of 0.5 μm as the heat spreader, 0.9 wt % of VGCF as the conductive agent, and 3 wt % of polyacrylonitrile as the binding agent were mixed, wherein the volume ratio of aluminum oxide to the conductive agent was set to 1.9, and the battery was charged to a voltage of 4.35 V.

Example 28

A nonaqueous electrolyte secondary battery was made in the same manner as in Example 21, except that 90.3 wt % of polymer-coated artificial graphite as the anode active material, 6.9 wt % of aluminum oxide having an average particle diameter of 0.5 μm as the heat spreader, 0.8 wt % of VGCF as the conductive agent, 1 wt % of CMC as the thickener, and 1 wt % of SBR as the binding agent were mixed, wherein the volume ratio of aluminum oxide to the conductive agent was set to 4.9, and the battery was charged to a voltage of 4.35 V.

Example 29

A nonaqueous electrolyte secondary battery was made in the same manner as in Example 21, except that 60 wt % of MCMB and 31.5 wt % of highly graphitized graphite as the anode active materials, 3.5 wt % of aluminum oxide having an average particle diameter of 0.5 μm as the heat spreader, 1 wt % of VGCF as the conductive agent, and 4 wt % of PVdF as the binding agent were mixed, wherein the volume ratio of aluminum oxide to the conductive agent was set to 2.0, a three-layer separator having a thickness of 15 μm and including polyethylene PE as the base material layer and polypropylene PP as the surface layer was used, and the battery was charged to a voltage of 4.40 V.

Example 30

A nonaqueous electrolyte secondary battery was made in the same manner as in Example 21, except that 70 wt % of a tin-based amorphous material made of tin Sn, cobalt Co, and carbon C elements homogeneously mixed at an atom level, and 21.5 wt % of graphite as the anode active materials, 3.5 wt % of aluminum oxide having an average particle diameter of 0.5 μm as the heat spreader, 1 wt % of VGCF as the conductive agent, and 4 wt % of PVdF as the binding agent were mixed, wherein the volume ratio of aluminum oxide to the conductive agent was set to 2.0, a three-layer separator having a thickness of 15 μm and including polyethylene PE as the base material layer and polypropylene PP as the surface layer was used, and the battery was charged to a voltage of 4.20 V.

Example 31

A nonaqueous electrolyte secondary battery was made in the same manner as in Example 21, except that 90.5 wt % of silicon Si as the anode active material, 3.5 wt % aluminum oxide having an average particle diameter of 0.5 μm as the heat spreader, 1 wt % of VGCF as the conductive agent, and 5 wt % of polyimide as the binding agent were mixed, wherein the volume ratio of aluminum oxide to the conductive agent was set to 2.0, a separator having a thickness of 18 μm made by molding a mixture of polypropylene and polyethylene into a film was used, and the battery was charged to a voltage of 4.35 V.

Example 32

A nonaqueous electrolyte secondary battery was made in the same manner as in Example 21, except that 92.5 wt % of a carbon material as the anode active material, 3.5 wt % aluminum oxide having an average particle diameter of 0.5

μm as the heat spreader, 1 wt % of VGCF as the conductive agent, 2 wt % of PVdF as the binding agent, and 1 wt % of polyacrylonitrile were mixed, wherein the volume ratio of aluminum oxide to the conductive agent was set to 2.0, a separator made of aramid-containing polyethylene PE having a thickness of 18 μm was used, and the battery was charged to a voltage of 4.35 V.

Comparative Example 15

A nonaqueous electrolyte secondary battery was made in the same manner as in Example 21, except that no aluminum oxide was added, 94.5 wt % of MCMB as the anode active material, 1.5 wt % of VGCF as the conductive agent, and 4 wt % of PVdF as the binding agent were mixed.

Comparative Example 16

A nonaqueous electrolyte secondary battery was made in the same manner as in Example 21, except that no aluminum oxide was added, 94.5 wt % of carbon containing 3 wt % of aluminum oxide as the anode active material, 2.5 wt % of VGCF as the conductive agent, 1 wt % of CMC as the thickener, and 2 wt % of SBR as the binding agent were mixed, and the battery was charged to a voltage of 4.20 V.

Comparative Example 17

A nonaqueous electrolyte secondary battery was made in the same manner as in Example 21, except that no aluminum oxide was added, 70 wt % of a tin-based amorphous material made of tin Sn, cobalt Co, and carbon C elements homogeneously mixed at an atom level, and 25 wt % of graphite as the anode active materials, 1 wt % of VGCF as the conductive agent, and 4 wt % of PVdF as the binding agent were mixed, and the battery was charged to a voltage of 4.35 V.

Comparative Example 18

A nonaqueous electrolyte secondary battery was made in the same manner as in Example 21, except that no aluminum oxide was added, 94 wt % of silicon Si as the anode active material, 1 wt % of VGCF as the conductive agent, and 5 wt % of polyimide as the binding agent were mixed, and the battery was charged to a voltage of 4.35 V.

Comparative Example 19

A nonaqueous electrolyte secondary battery was made in the same manner as in Example 21, except that no aluminum oxide was added, 94 wt % of a carbon material as the anode active material, 1 wt % of VGCF as the conductive agent, and 5 wt % of PVdF as the binding agent were mixed, and the battery was charged to a voltage of 4.35 V.

Comparative Example 20

A nonaqueous electrolyte secondary battery was made in the same manner as in Example 21, except that the having an average particle diameter of and the content of aluminum oxide were changed to 0.5 μm and 3 wt %, respectively, 90.5 wt % of MCMB as the anode active material, 2.5 wt % of VGCF as the conductive agent, and 4 wt % of PVdF as the binding agent were mixed, wherein the volume ratio of aluminum oxide to the conductive agent was set to 0.7, and the gelatinous electrolyte was prepared by keeping the electrolytic solution in PVdF copolymerized with 6.9% of hexafluoropropylene HFP.

Comparative Example 21

A nonaqueous electrolyte secondary battery was made in the same manner as in Example 21, except that the having an average particle diameter of and the content of aluminum oxide were changed to 0.5 μm and 10 wt %, respectively, 83.9 wt % of MCMB as the anode active material, 1.1 wt % of VGCF as the conductive agent, and 5 wt % of PVdF as the binding agent were mixed, wherein the volume ratio of aluminum oxide to the conductive agent was set to 5.2, and the gelatinous electrolyte was prepared by keeping the electrolytic solution in PVdF copolymerized with 6.9% of hexafluoropropylene HFP.

The nonaqueous electrolyte secondary battery of Examples 21 to 32 and Comparative Examples 15 to 21 were subjected to (a) measurement of rated energy density, (b) measurement of battery swelling, and (c) nail penetration safety test in the same manner as that for the nonaqueous electrolyte batteries of Examples 1 to 20 and Comparative Examples 1 to 14. Table 5 lists the results of the measurements.

TABLE 5

|  | NOMINAL ENERGY DENSITY [Wh/l] | LOAD CHARACTERISTIC [%] | PEAK TEMPERATURE [° C.] |
| --- | --- | --- | --- |
| EXAMPLE 21 | 488 | 83 | 87 |
| EXAMPLE 22 | 485 | 81 | 57 |
| EXAMPLE 23 | 493 | 82 | 85 |
| EXAMPLE 24 | 495 | 84 | 81 |
| EXAMPLE 25 | 500 | 84 | 85 |
| EXAMPLE 26 | 500 | 82 | 84 |
| EXAMPLE 27 | 508 | 83 | 83 |
| EXAMPLE 28 | 512 | 83 | 82 |
| EXAMPLE 29 | 515 | 83 | 69 |
| EXAMPLE 30 | 545 | 84 | 86 |
| EXAMPLE 31 | 596 | 84 | 89 |
| EXAMPLE 32 | 542 | 85 | 71 |
| COMPARATIVE EXAMPLE 15 | 475 | 81 | THERMAL RUNAWAY |
| COMPARATIVE EXAMPLE 16 | 462 | 59 | THERMAL RUNAWAY |
| COMPARATIVE EXAMPLE 17 | 512 | 84 | THERMAL RUNAWAY |
| COMPARATIVE EXAMPLE 18 | 537 | 83 | THERMAL RUNAWAY |
| COMPARATIVE EXAMPLE 19 | 521 | 75 | THERMAL RUNAWAY |
| COMPARATIVE EXAMPLE 20 | 482 | 79 | 120 |
| COMPARATIVE EXAMPLE 21 | 476 | 69 | 117 |

In Table 5, a rated energy density of 480 Wh/l or more, a load characteristic of 80% or more, and a peak temperature of 100° C. or lower in the nail penetration safety test were each regarded as acceptable.

As shown by the comparison between Examples 21, 22, 23, 25, and 26 with Comparative Example 1, when an appropriate amount of aluminum oxide was added to a battery including MCMB as the anode active material and VGCF as the anode conductive agent and having a charged voltage of 4.25 V, the temperature rise in the battery was inhibited. As shown by Examples 24, 27 to 32 and Comparative Examples 16 to 19, even when the other anode active materials were used, the addition of an appropriate amount of aluminum oxide inhibited the temperature rise in the battery.

As shown by Examples 21, 22, and 26, when the average particle diameter and the content of aluminum oxide were 0.1 μm or more to 5.0 μm to less and 1.5 wt % or more to 10 wt % or less, respectively, the decrease in the rated energy density and load characteristic was prevented, and the temperature rise in the battery was inhibited.

As shown by Examples 21 and 28, and Comparative Examples 20 and 21, when the volume ratio of aluminum oxide to the conductive agent was set to 0.8 or more to 5.0 or less, the decrease in the rated energy density and load characteristic was prevented, and the temperature rise in the battery was inhibited.

Tables 6 and 7 list the constituent elements of the nonaqueous electrolyte batteries of Examples 33 to 43 and Comparative Examples 22 to 28. These examples are further described in detail with reference to Tables 6 and 7.

TABLE 6

| | HEAT SPREADER | | | | |
|---|---|---|---|---|---|
| | METAL OXIDE | AVERAGE PARTICLE DIAMETER [μm] | CONTENT [wt %] | ANODE ACTIVE MATERIAL | BINDING MATERIAL |
| EXAMPLE 33 | $Al_2O_3$ | 0.5 | 1.5 | MCMB | PVdF |
| EXAMPLE 34 | $Al_2O_3$ | 5 | 10 | MCMB | PVdF |
| EXAMPLE 35 | $Al_2O_3$ | 0.1 | 3 | MCMB | PVdF |
| EXAMPLE 36 | $Al_2O_3$ | 0.2 | 5 | MCMB | PVdF |
| EXAMPLE 37 | $Al_2O_3$ | 0.5 | 5 | HIGHLY GRAPHITIZED GRAPHITE | SBR |
| EXAMPLE 38 | $Al_2O_3$ | 0.5 | 3 | SURFACE-MODIFIED NATURAL GRAPHITE | POLYACRYLONITRILE |
| EXAMPLE 39 | $Al_2O_3$ | 0.5 | 7 | POLYMER-COATED ARTIFICIAL GRAPHITE | CMC + SBR |
| EXAMPLE 40 | $Al_2O_3$ | 0.5 | 5 | MCMB/HIGHLY GRAPHITIZED GRAPHITE MIXTURE | CMC + SBR |
| EXAMPLE 41 | $Al_2O_3$ | 0.5 | 3 | Sn/Co/CARBON MIXTURE | PVdF |
| EXAMPLE 42 | $Al_2O_3$ | 0.5 | 3 | Si | POLYIMIDE |
| EXAMPLE 43 | $Al_2O_3$ | 0.5 | 3 | CARBON MATERIAL | PVdF + POLYACRYLONITRILE |
| COMPARATIVE EXAMPLE 22 | NONE | — | — | MCMB | PVdF |
| COMPARATIVE EXAMPLE 23 | NONE | — | — | CARBON CONTAINING 3 wt % ALUMINUM OXIDE | CMC + SBR |
| COMPARATIVE EXAMPLE 24 | NONE | — | — | Sn/Co/CARBON MIXTURE | PVdF |
| COMPARATIVE EXAMPLE 25 | NONE | — | — | Si | POLYIMIDE |
| COMPARATIVE EXAMPLE 26 | NONE | — | — | CARBON MATERIAL | PVdF |
| COMPARATIVE EXAMPLE 27 | $Al_2O_3$ | 0.5 | 3 | MCMB | PVdF |
| COMPARATIVE EXAMPLE 28 | $Al_2O_3$ | 0.5 | 10 | MCMB | PVdF |

| | CONDUCTIVE MATERIAL | | | |
|---|---|---|---|---|
| | CONDUCTIVE RAW MATERIAL | CONTENT [wt %] | HEAT SPREADER/ CONDUCTIVE MATERIAL RATIO | FILLING RATE[%] |
| EXAMPLE 33 | VGCF | 1.05 | 0.8 | 84 |
| EXAMPLE 34 | VGCF | 1.15 | 5.0 | 84 |
| EXAMPLE 35 | VGCF | 1 | 1.7 | 84 |
| EXAMPLE 36 | VGCF | 2 | 1.4 | 84 |
| EXAMPLE 37 | VGCF | 1.5 | 1.9 | 80 |
| EXAMPLE 38 | VGCF | 1 | 1.7 | 81 |
| EXAMPLE 39 | VGCF | 0.8 | 5.0 | 82 |
| EXAMPLE 40 | VGCF | 2 | 1.4 | 83 |
| EXAMPLE 41 | VGCF | 1 | 1.7 | 80 |
| EXAMPLE 42 | VGCF | 1 | 1.7 | 82 |
| EXAMPLE 43 | VGCF | 1 | 1.7 | 80 |
| COMPARATIVE EXAMPLE 22 | VGCF | 1.5 | — | 75 |
| COMPARATIVE EXAMPLE 23 | VGCF | 2.5 | — | 70 |

TABLE 6-continued

| | | | | | |
|---|---|---|---|---|---|
| COMPARATIVE EXAMPLE 24 | VGCF | 1 | — | 76 |
| COMPARATIVE EXAMPLE 25 | VGCF | 1 | — | 78 |
| COMPARATIVE EXAMPLE 26 | VGCF | 1 | — | 71 |
| COMPARATIVE EXAMPLE 27 | VGCF | 2.5 | 0.7 | 75 |
| COMPARATIVE EXAMPLE 28 | VGCF | 1.1 | 5.2 | 71 |

TABLE 7

| | CHARGED VOLTAGE [V] | SEPARATOR MATERIAL | SEPARATOR THICKNESS [μm] | ELECTROLYTE |
|---|---|---|---|---|
| EXAMPLE 33 | 4.25 | PE | 20 | LIQUID |
| EXAMPLE 34 | 4.25 | PE | 20 | LIQUID |
| EXAMPLE 35 | 4.25 | PE | 20 | LIQUID |
| EXAMPLE 36 | 4.25 | PE | 20 | LIQUID |
| EXAMPLE 37 | 4.25 | PET CONTAINING $Al_2O_3$, $SiO_2$ | 20 | LIQUID |
| EXAMPLE 38 | 4.35 | PP | 20 | LIQUID |
| EXAMPLE 39 | 4.35 | PP | 20 | LIQUID |
| EXAMPLE 40 | 4.40 | PP/PE/PP | 15 | LIQUID |
| EXAMPLE 41 | 4.20 | PP/PE/PP | 15 | LIQUID |
| EXAMPLE 42 | 4.35 | PP/PE MIXTURE | 18 | LIQUID |
| EXAMPLE 43 | 4.35 | ARAMID-CONTAINING PE | 18 | LIQUID |
| COMPARATIVE EXAMPLE 22 | 4.25 | PE | 20 | LIQUID |
| COMPARATIVE EXAMPLE 23 | 4.20 | PE | 20 | LIQUID |
| COMPARATIVE EXAMPLE 24 | 4.35 | PE | 20 | LIQUID |
| COMPARATIVE EXAMPLE 25 | 4.35 | PE | 20 | LIQUID |
| COMPARATIVE EXAMPLE 26 | 4.35 | PE | 20 | LIQUID |
| COMPARATIVE EXAMPLE 27 | 4.25 | PE | 9 | LIQUID |
| COMPARATIVE EXAMPLE 28 | 4.25 | PE | 9 | LIQUID |

Example 33

[Making of Cathode]

95 wt % of lithium cobaltate $LiCoO_2$ as the cathode active material, 2 wt % of graphite as the conductive agent, and 3 wt % of PVdF as the binding agent were mixed, and dispersed in N-methyl-2-pyrrolidone cathode to make a mixture slurry. Subsequently, the cathode mixture slurry was uniformly applied to both the surfaces of a cathode collector made of a strip aluminum foil having a thickness of 15 μm. Subsequently, the collector was dried, and compression molded with a roll pressing machine to form a cathode active material layer, thus a cathode was made. Thereafter, a cathode terminal made of aluminum was connected to one end of the cathode collector.

[Making of Anode]

93.45 wt % of MCMB (Meso-Carbon Micro Beads: spherical carbon fine particles) as the anode active material, 1.5 wt % of aluminum oxide having an average particle diameter of 0.5 μm as the heat spreader, 1.05 wt % of VGCF as the conductive agent, and 4 wt % of PVdF as the binding agent were mixed, wherein the volume ratio of aluminum oxide to the conductive agent was set to 0.8. Subsequently, the cathode mixture was dispersed in N-methyl-2-pyrrolidone to make a cathode mixture slurry, and the slurry was uniformly applied to both the surfaces of a cathode collector made of a strip copper foil having a thickness of 12 μm. Subsequently, the collector was dried, compression molded with a roll pressing machine to form an anode active material layer, thus an anode was made. Thereafter, an anode terminal made of nickel was connected to one end of the anode collector.

[Making of Electrolytic Solution]

Ethylene carbonate and dimethyl carbonate were mixed at an weight ratio of 1:1 to make a solution, and $LiPF_6$ as the electrolyte salt was added to the solution at a concentration of 1 mol/l, thus a nonaqueous electrolytic solution was prepared.

[Battery Assembling Step]

The cathode and anode made as described above were laminated via a separator made of polyethylene having a thickness of 20 μm, and wound in a longitudinal direction to make a jelly roll type battery element. Subsequently, the jelly roll type battery element was sandwiched between a pair of insulating plates, an anode lead was welded to the battery can, simultaneously a cathode lead was welded to the safety valve device, and the wound electrode assembly was accommodated in the battery can made of nickel-plated iron. Thereafter, 4.0 g of the electrolytic solution was injected into the battery can by a reduced pressure method.

After the electrolytic solution was injected into the battery can, a battery cap was crimped to the battery can via a gasket having a surface coated with asphalt. Subsequently, the nonaqueous electrolyte secondary battery was charged to a voltage of 4.25 V, thus a cylinder type secondary battery having a diameter of 18 mm and a height of 65 mm was made.

Example 34

A nonaqueous electrolyte secondary battery was made in the same manner as in Example 33, except that the average particle diameter of and the content of aluminum oxide were changed to 5 μm and 10 wt %, respectively, and the content of VGCF as the conductive agent used in the anode was changed to 1.15 wt %. The volume ratio of aluminum oxide to the conductive agent was 5.0.

Example 35

A nonaqueous electrolyte secondary battery was made in the same manner as in Example 33, except that the an average particle diameter of and the content of aluminum oxide were changed to 0.1 μm and 3 wt %, respectively, and the content of VGCF as the conductive agent used in the anode was changed to 1 wt %. The volume ratio of aluminum oxide to the conductive agent was 1.7.

Example 36

A nonaqueous electrolyte secondary battery was made in the same manner as in Example 33, except that the average particle diameter of and the content of aluminum oxide were changed to 0.2 μm and 5 wt %, respectively, and the content of VGCF as the conductive agent used in the anode was changed to 2 wt %. The volume ratio of aluminum oxide to the conductive agent was 1.4.

Example 37

A nonaqueous electrolyte secondary battery was made in the same manner as in Example 33, except that 91.5 wt % of highly graphitized graphite as the anode active material, 5 wt % of aluminum oxide having an average particle diameter of 0.5 μm as the heat spreader, 1.5 wt % of VGCF as the conductive agent, 1 wt % of CMC and 1 wt % of SBR as the binding agents were mixed, wherein the volume ratio of aluminum oxide to the conductive agent was set to 1.9, and a separator having a thickness of 20 μm made by molding a mixture of polyethylene terephthalate PET, aluminum oxide, and silicon oxide into a film was used.

Example 38

A nonaqueous electrolyte secondary battery was made in the same manner as in Example 33, except that 94 wt % of surface-modified natural graphite as the anode active material, 3 wt % of aluminum oxide having an average particle diameter of 0.5 μm as the heat spreader, 1 wt % of VGCF of as the conductive agent, and 2 wt % of polyacrylonitrile as the binding agent were mixed, wherein the volume ratio of aluminum oxide to the conductive agent was set to 1.7, polypropylene PP was used as the separator, and the battery was charged to a voltage of 4.35 V.

Example 39

A nonaqueous electrolyte secondary battery was made in the same manner as in Example 33, except that 90.2 wt % of polymer-coated artificial graphite as the anode active material, 7 wt % of aluminum oxide having an average particle diameter of 0.5 μm as the heat spreader, 0.8 wt % of VGCF as the conductive agent, 1% of CMC as the thickener, and 1 wt % of SBR as the binding agent were mixed, wherein the volume ratio of aluminum oxide to the conductive agent was set to 5.0, polypropylene PP was used as the separator, and the battery was charged to a voltage of 4.35 V.

Example 40

A nonaqueous electrolyte secondary battery was made in the same manner as in Example 33, except that 60 wt % of MCMB and 31 wt % of highly graphitized graphite as the anode active materials, 5 wt % of aluminum oxide having an average particle diameter of 0.5 μm as the heat spreader, 2 wt % of VGCF as the conductive agent, 1 wt % of CMC as the thickener, and 1 wt % of SBR as the binding agent were mixed, wherein the volume ratio of aluminum oxide to the conductive agent was set to 1.4, a three-layer separator having a thickness of 15 μm and including polyethylene PE as the base material layer and polypropylene PP as the surface layer was used, and the battery was charged to a voltage of 4.40 V.

Example 41

A nonaqueous electrolyte secondary battery was made in the same manner as in Example 33, except that 70 wt % of a tin-based amorphous material made of tin Sn, cobalt Co, and carbon C elements homogeneously mixed at an atom level, and 22 wt % of graphite as the anode active materials, 3 wt % of aluminum oxide having an average particle diameter of 0.5 μm as the heat spreader, 1 wt % of VGCF as the conductive agent, and 4 wt % of PVdF as the binding agent were mixed, wherein the volume ratio of aluminum oxide to the conductive agent was set to 2.0, a three-layer separator having a thickness of 15 μm and including polyethylene PE as the base material layer and polypropylene PP as the surface layer was used, and the battery was charged to a voltage of 4.20 V.

Example 42

A nonaqueous electrolyte secondary battery was made in the same manner as in Example 33, except that 91 wt % of silicon Si as the anode active material, 3 wt % of aluminum oxide having an average particle diameter of 0.5 μm as the heat spreader, 1 wt % of VGCF as the conductive agent, and 5 wt % of polyimide as the binding agent were mixed, wherein the volume ratio of aluminum oxide to the conductive agent was set to 1.7, a three-layer separator having a thickness of 18 μm and formed by molding a mixture of polyethylene PE and polypropylene PP into a film was used, and the battery was charged to a voltage of 4.35 V.

Example 43

A nonaqueous electrolyte secondary battery was made in the same manner as in Example 33, except that 93 wt % of a carbon material as the anode active material, 3 wt % of aluminum oxide having an average particle diameter of 0.5 μm as the heat spreader, 1 wt % of VGCF as the conductive agent, and 2 wt % of PVdF and 1 wt % of polyacrylonitrile as the binding agents were mixed, wherein the volume ratio of aluminum oxide to the conductive agent was set to 1.7, a separator made of aramid-containing polyethylene having a thickness of 18 μm was used, and the battery was charged to a voltage of 4.35 V.

Comparative Example 22

A nonaqueous electrolyte secondary battery was made in the same manner as in Example 33, except that no aluminum oxide was added, 94.5 wt % of MCMB as the anode active material, 1.5 wt % of VGCF as the conductive agent, and 4 wt % of PVdF as the binding agent were mixed.

Comparative Example 23

A nonaqueous electrolyte secondary battery was made in the same manner as in Example 33, except that no aluminum oxide was added, 95.5 wt % of carbon containing 3 wt % of aluminum oxide as the anode active material, 2.5 wt % of VGCF as the conductive agent, and 1 wt % of CMC and 1 wt % of SBR as the binding agents were mixed, and the battery was charged to a voltage of 4.20 V.

Comparative Example 24

A nonaqueous electrolyte secondary battery was made in the same manner as in Example 33, except that no aluminum oxide was added, 70 wt % of a tin-based amorphous material made of tin Sn, cobalt Co, and carbon C elements homogeneously mixed at an atom level, and 25 wt % of graphite as the anode active materials, 1 wt % of VGCF as the conductive agent, and 4 wt % of PVdF as the binding agent were mixed, and the battery was charged to a voltage of 4.35 V.

Comparative Example 25

A nonaqueous electrolyte secondary battery was made in the same manner as in Example 33, except that no aluminum oxide was added, 94 wt % of silicon Si as the anode active material, 1 wt % of VGCF as the conductive agent, and 5 wt % of polyimide as the binding agent were mixed, and the battery was charged to a voltage of 4.35 V.

Comparative Example 26

A nonaqueous electrolyte secondary battery was made in the same manner as in Example 33, except that no aluminum oxide was added, 95 wt % of a carbon material as the anode active material, 1 wt % of VGCF as the conductive agent, and 4 wt % of PVdF as the binding agent were mixed, and the battery was charged to a voltage of 4.35 V.

Comparative Example 27

A nonaqueous electrolyte secondary battery was made in the same manner as in Example 33, except that the average particle diameter and the content of aluminum oxide were changed to 0.5 µm and 3 wt %, respectively, 90.5 wt % of MCMB as the anode active material, 2.5 wt % of VGCF as the conductive agent, and 4 wt % of PVDF as the binding agent were mixed, wherein the volume ratio of aluminum oxide to the conductive agent was set to 0.7, and the thickness of the separator was changed to 9 µm.

Comparative Example 28

A nonaqueous electrolyte secondary battery was made in the same manner as in Example 33, except that the average particle diameter and the content of aluminum oxide were changed to 0.5 µm and 10 wt %, respectively, 84.9 wt % of MCMB as the anode active material, 1.1 wt % of VGCF as the conductive agent, and 4 wt % of PVDF as the binding agent were mixed, wherein the volume ratio of aluminum oxide to the conductive agent was set to 5.2, and the thickness of the separator was changed to 9 µm.

The nonaqueous electrolyte secondary batteries of Examples 33 to 43 and Comparative Examples 22 to 28 were subjected to (a) measurement of rated energy density, (b) measurement of battery swelling, and (c) nail penetration safety test in the same manner as that for the nonaqueous electrolyte batteries of Examples 1 to 20 and Comparative Examples 1 to 14. Table 8 lists the results of the measurements.

TABLE 8

|  | NOMINAL ENERGY DENSITY [Wh/l] | LOAD CHARACTERISTIC [%] | PEAK TEMPERATURE [° C.] |
| --- | --- | --- | --- |
| EXAMPLE 33 | 610 | 90 | 88 |
| EXAMPLE 34 | 605 | 90 | 54 |
| EXAMPLE 35 | 615 | 89 | 54 |
| EXAMPLE 36 | 615 | 90 | 87 |
| EXAMPLE 37 | 615 | 88 | 80 |
| EXAMPLE 38 | 640 | 87 | 83 |
| EXAMPLE 39 | 645 | 86 | 83 |
| EXAMPLE 40 | 655 | 90 | 63 |
| EXAMPLE 41 | 660 | 91 | 88 |
| EXAMPLE 42 | 700 | 90 | 90 |
| EXAMPLE 43 | 660 | 84 | 61 |
| COMPARATIVE EXAMPLE 22 | 600 | 85 | THERMAL RUNAWAY |
| COMPARATIVE EXAMPLE 23 | 583 | 65 | THERMAL RUNAWAY |
| COMPARATIVE EXAMPLE 24 | 601 | 84 | THERMAL RUNAWAY |
| COMPARATIVE EXAMPLE 25 | 605 | 86 | THERMAL RUNAWAY |
| COMPARATIVE EXAMPLE 26 | 584 | 71 | THERMAL RUNAWAY |
| COMPARATIVE EXAMPLE 27 | 492 | 84 | 128 |
| COMPARATIVE EXAMPLE 28 | 486 | 72 | 125 |

In Table 8, a rated energy density of 600 Wh/l or more, a load characteristic of 80% or more, and a peak temperature of 100° C. or lower in the nail penetration safety test were each regarded as acceptable.

As shown by the comparison between Examples 33, 34, 35, 36 with Comparative Example 22, when an appropriate amount of aluminum oxide was added to a battery including MCMB as the anode active material, VGCF as the anode conductive agent and having a charged voltage of 4.25 V, the temperature rise in the battery was inhibited. As shown by Examples 37 to 43 and Comparative Examples 23 to 26, even when the other anode active materials were used, the addition of an appropriate amount of aluminum oxide inhibited the temperature rise in the battery.

Further, as shown by Examples 33, 34, and 35, when the average particle diameter and the content of aluminum oxide was 0.1 µm or more to 5.0 µm or less, and 1.5 wt % or more to 10 wt % or less, respectively, the decrease in the rated energy density and load characteristic was prevented, and the temperature rise in the battery was inhibited.

Further, as shown by Examples 33 and 34, and Comparative Examples 27 and 28, when the volume ratio of aluminum oxide to the conductive agent was set to 0.8 or more to 5.0 or less, the decrease in the rated energy density and load characteristic was prevented, and the temperature rise in the battery was inhibited.

The above results indicate that when a nonaqueous electrolyte secondary battery includes an anode mixture contains 1.5 wt % or more to 10 wt % or less of aluminum oxide having an average particle diameter of 0.1 μm or more to 5.0 μm or less, wherein the volume of aluminum oxide to the anode conductive agent is 0.8 or more to 5.0 or less, the temperature rise in the battery is inhibited even during nail penetration, and the battery has a high battery capacity and a high load characteristic.

The first to third embodiments are illustrated above, but the present invention is not limited to the first to third embodiments, and may be deformed in various ways on the basis of the technical concept.

For example, the values in the first to third embodiments are only exemplary, and values from them may be used as necessary.

It should be understood by those skilled in the art that various modifications, combinations, sub-combinations and alternations may occur depending on design requirements and other factors insofar as they are within the scope of the appended claims or the equivalents thereof.

The invention is claimed as follows:

1. A nonaqueous electrolyte secondary battery comprising:
a cathode;
an anode containing at least an anode active material and a conductive agent; and
a nonaqueous electrolyte,
wherein the anode has an anode mixture, the anode mixture containing 1.5 wt % or more to 10 wt % or less aluminum oxide which has an average particle diameter of 0.1 μm or more to 5.0 μm or less, and
wherein the nonaqueous electrolyte includes an electrolytic solution and a polymer formed by polymerization of a polyvinylidene fluoride compound or derivative thereof.

2. A nonaqueous electrolyte secondary battery comprising:
a cathode;
an anode containing at least an anode active material and a conductive agent; and
a nonaqueous electrolyte,
wherein the anode has an anode mixture, the anode mixture containing 1.5 wt % or more to 10 wt % or less aluminum oxide which has an average particle diameter of 0.1 μm or more to 5.0 μm or less, and
wherein the nonaqueous electrolyte includes an electrolytic solution and a polymer formed by polymerization of a polyvinyl acetal compound or derivative thereof.

3. A nonaqueous electrolyte secondary battery comprising:
a cathode;
an anode containing at least an anode active material and a conductive agent; and
a nonaqueous electrolyte,
wherein the anode has an anode mixture, the anode mixture containing 1.5 wt % or more to 10 wt % or less aluminum oxide which has an average particle diameter of 0.1 μm or more to 5.0 μm or less, and
wherein an open circuit voltage of a single cell is 4.25 V or higher to 6.00 V or lower, and wherein the nonaqueous electrolyte includes an electrolytic solution and a polymer formed by polymerization of a polyvinylidene fluoride compound, a polyvinyl acetal compound, or derivatives thereof.

4. The nonaqueous electrolyte secondary battery according to claim 3, wherein the volume ratio of the aluminum oxide to the conductive agent is 0.8 or more to 5.0 or less.

5. A nonaqueous electrolyte secondary battery comprising:
a cathode;
an anode containing at least an anode active material and a conductive agent; and
a nonaqueous electrolyte,
wherein the anode has an anode mixture, the anode mixture containing 1.5 wt % or more to 10 wt % or less aluminum oxide which has an average particle diameter of 0.1 μm or more to 5.0 μm or less, and
wherein an open circuit voltage of a single cell is 4.30 V or higher to 4.55 V or lower, and wherein the nonaqueous electrolyte includes an electrolytic solution and a polymer formed by polymerization of a polyvinylidene fluoride compound, a polyvinyl acetal compound, or derivatives thereof.

6. A nonaqueous electrolyte secondary battery comprising:
a cathode;
an anode containing at least an anode active material and a conductive agent; and
a nonaqueous electrolyte,
wherein the anode has an anode mixture, the anode mixture containing 1.5 wt % or more to 10 wt % or less aluminum oxide which has an average particle diameter of 0.1 μm or more to 5.0 μm or less, and
wherein an electric conductivity of the conductive agent is $5.0 \times 10^5$ S/m or more, and wherein the nonaqueous electrolyte includes an electrolytic solution and a polymer formed by polymerization of a polyvinylidene fluoride compound, a polyvinyl acetal compound, or derivatives thereof.

* * * * *